United States Patent
Weinstein et al.

(10) Patent No.: US 6,468,615 B2
(45) Date of Patent: *Oct. 22, 2002

(54) PRE-CUT FIBROUS INSULATION BLANKET

(75) Inventors: Larry J. Weinstein, Littleton, CO (US); Robert J. Allwein, Highlands Ranch, CO (US)

(73) Assignee: Johns Manville International, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/785,988

(22) Filed: Feb. 16, 2001

(65) Prior Publication Data

US 2002/0114913 A1 Aug. 22, 2002

(51) Int. Cl.[7] .................................................. B32B 3/10
(52) U.S. Cl. .............................. 428/43; 428/56; 428/61; 428/124; 52/404.1
(58) Field of Search .............................. 428/43, 61, 55, 428/56, 124; 52/404.1, 406.1, 406.2, 404.4

(56) References Cited

U.S. PATENT DOCUMENTS

| | | |
|---|---|---|
| 2,335,968 A | 12/1943 | Sawtell |
| 4,756,945 A | 7/1988 | Gibb |
| 4,866,905 A | 9/1989 | Bihy |
| 5,331,787 A | 7/1994 | Paulitschke |
| 5,545,453 A | 8/1996 | Grant |
| 5,567,504 A | 10/1996 | Schakel |
| 6,083,594 A | 7/2000 | Weinstein |
| 6,128,884 A | 10/2000 | Berdan |
| 6,165,305 A | 12/2000 | Weinstein |

FOREIGN PATENT DOCUMENTS

| | | |
|---|---|---|
| DE | 7830852 | 1/1979 |
| DE | 3118597 | 5/1981 |
| DE | 3203624 | 4/1983 |
| DE | 3229601 | 2/1984 |
| DE | 19700373 | 2/1998 |
| DE | 29822362 | 5/1999 |
| DE | 19914782 | 10/2000 |

*Primary Examiner*—Alexander S. Thomas
(74) *Attorney, Agent, or Firm*—Robert D. Touslee

(57) ABSTRACT

An elongated fibrous insulation blanket is pre-cut for custom fitting the insulation blanket into wall, floor, ceiling and roof cavities of different widths formed by the framework of a building. The blanket has one or more cuts extending for the length of the blanket which separate the blanket into two or more longitudinally extending sections. Adjacent sections of the blanket are joined together along the cut(s) by separable connectors which hold together the sections of the blanket for handling, but are separable by hand along the cut(s) so that the blanket can be handled as a unit for insulating a cavity having a predetermined width or easily separated by hand into two or more sections at a cut for insulating a cavity having a lesser width. Preferably, the separable connectors are formed by portions of sheets, overlaying and bonded to either or both major surfaces of the blanket, that are separable by hand along the cut(s) or by strips that extend along the cut(s) and are bonded to either or both major surfaces of the blanket on each side of the cut(s).

66 Claims, 4 Drawing Sheets

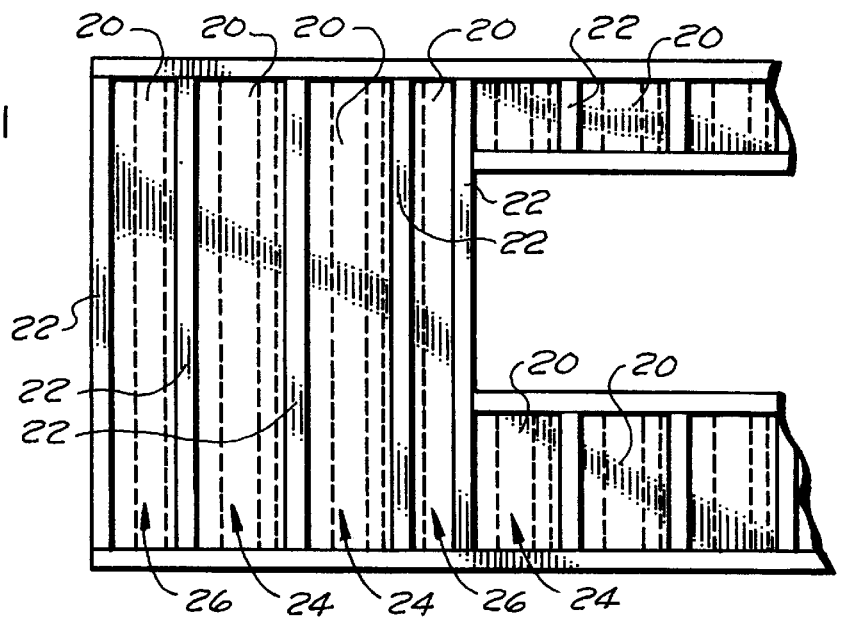
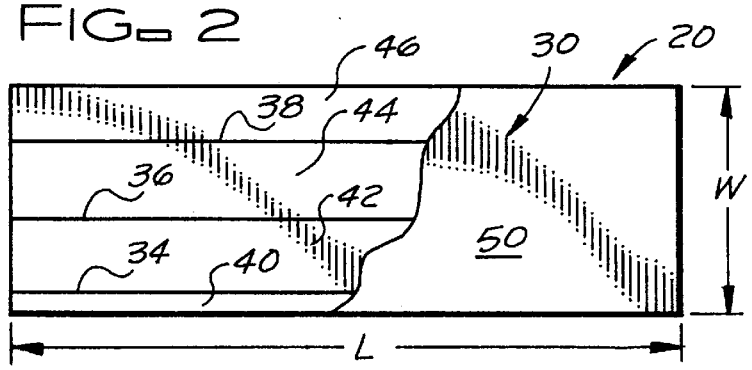
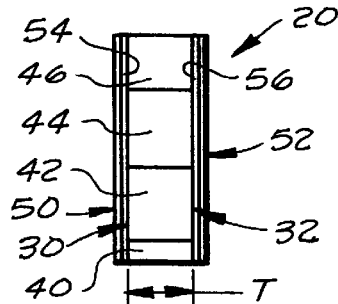
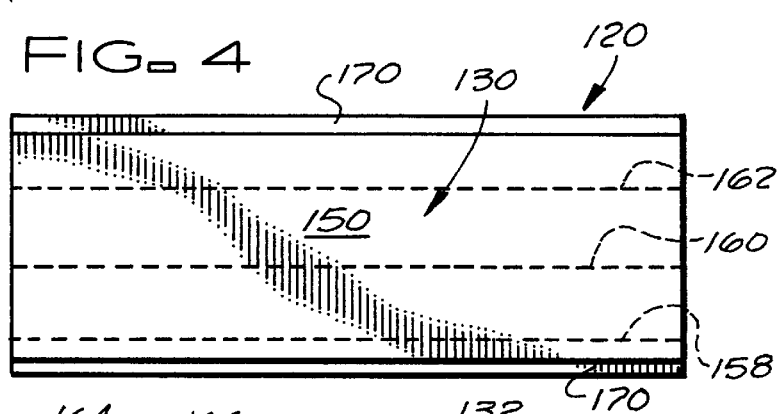
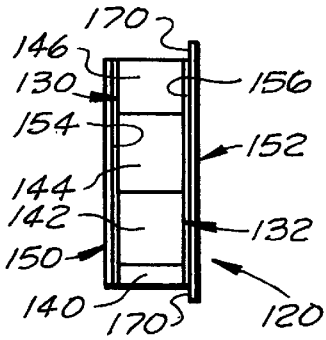
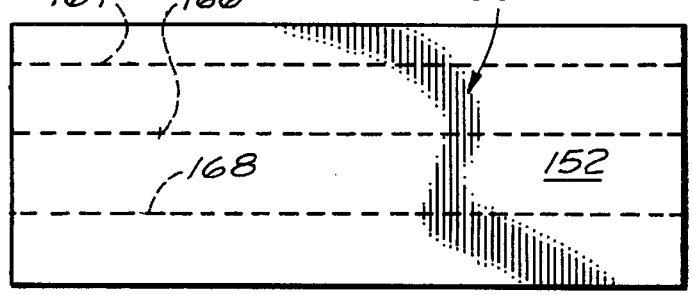

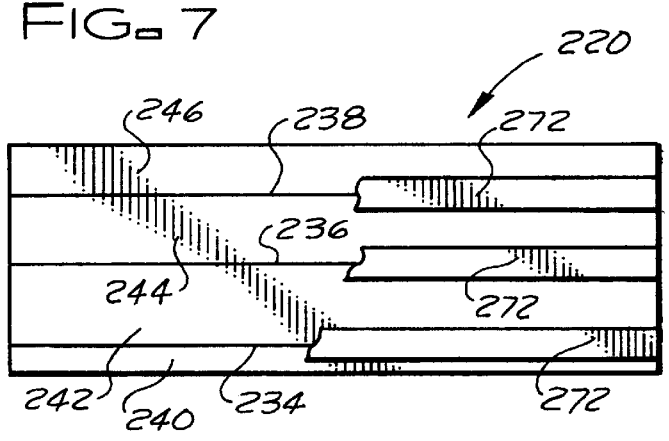
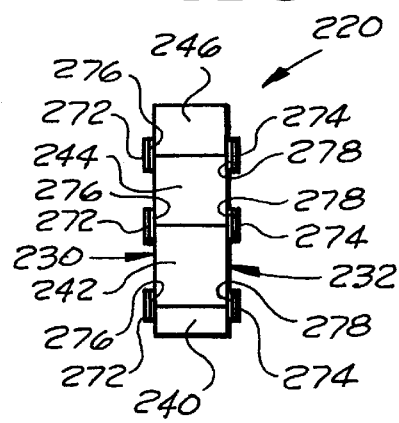
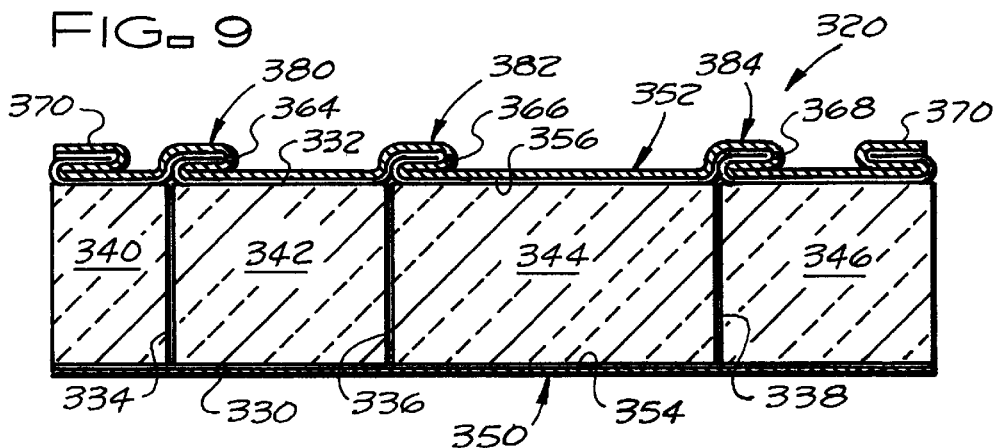
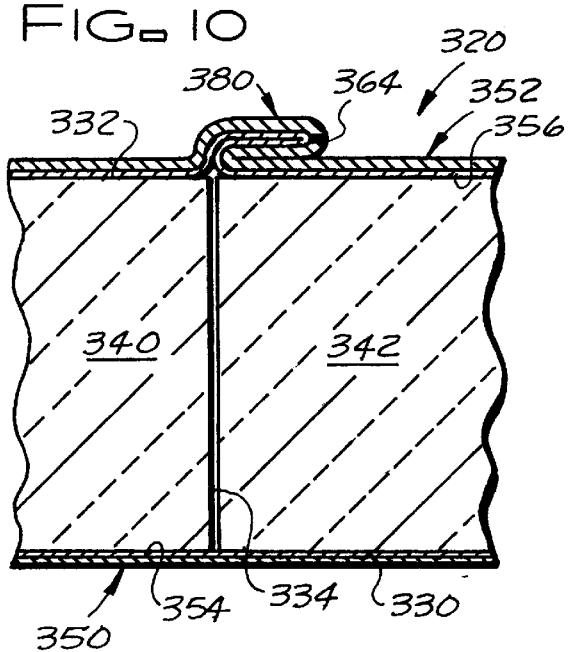
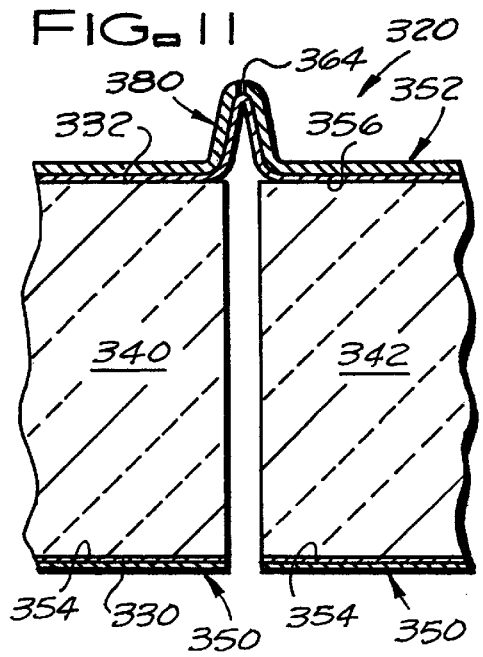

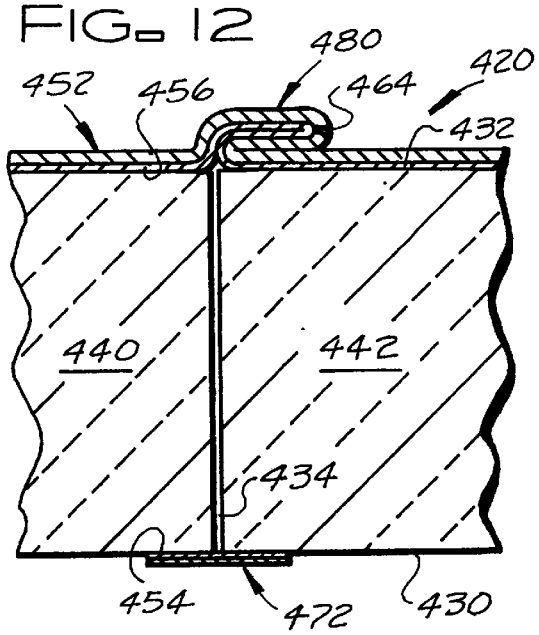
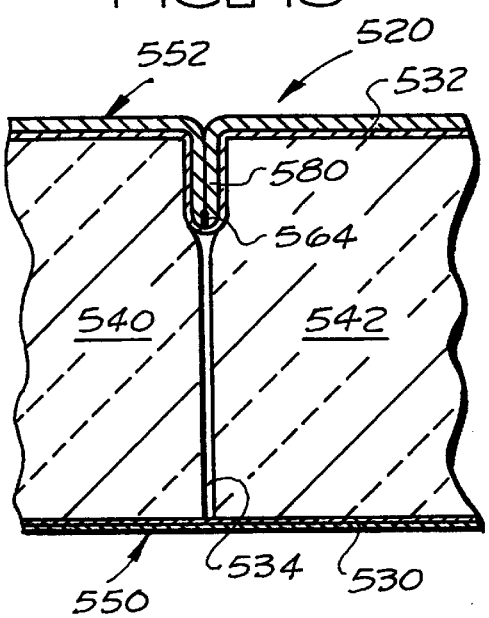
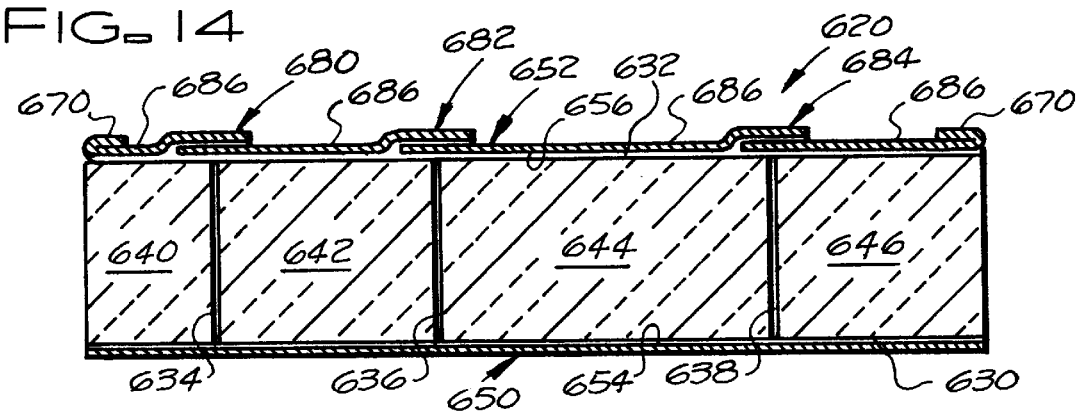
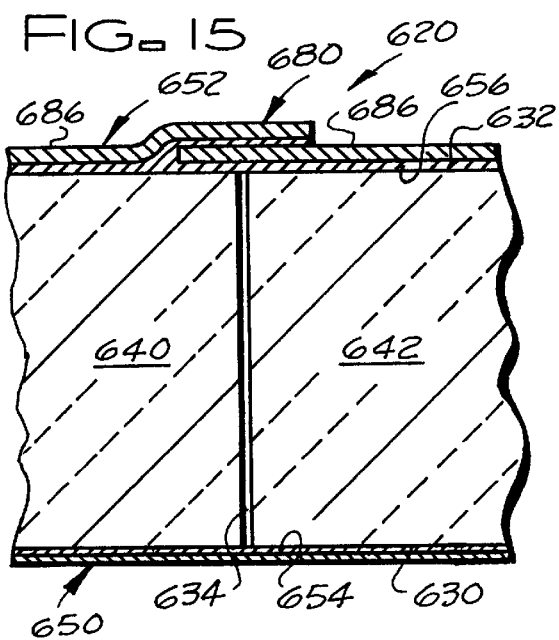
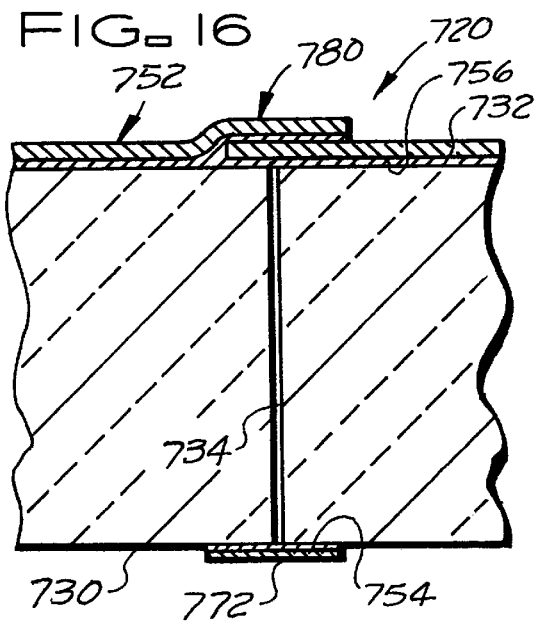

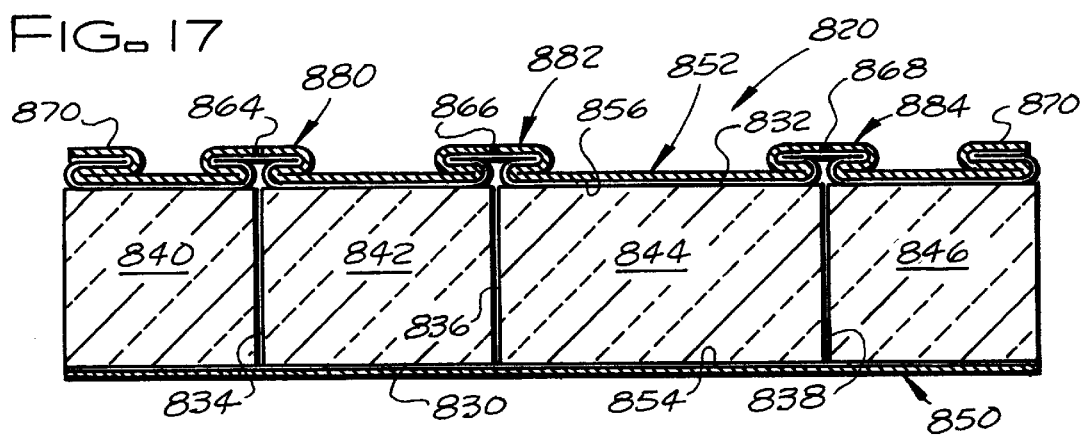
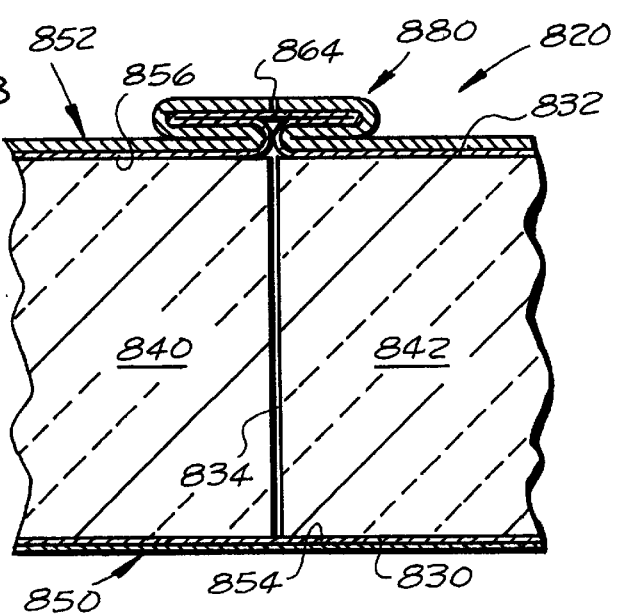
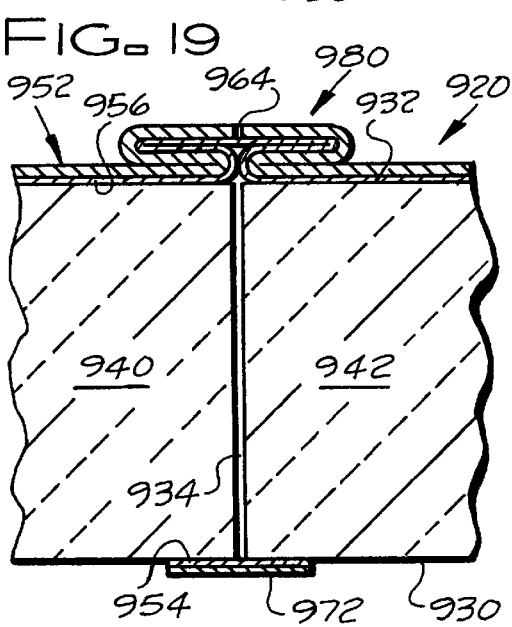
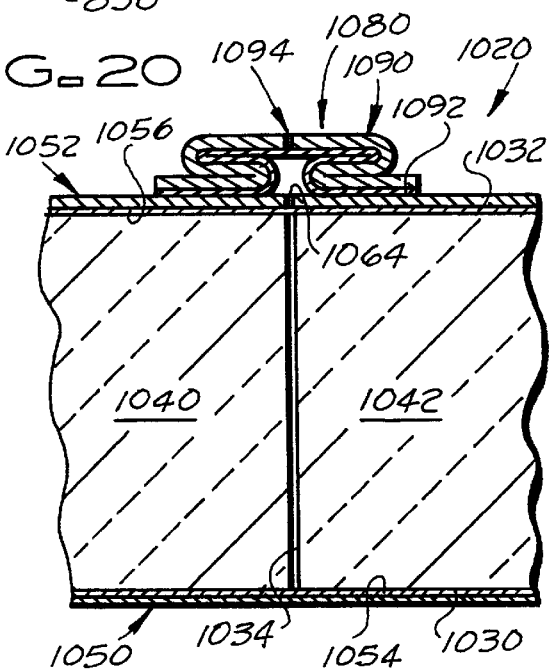

PRE-CUT FIBROUS INSULATION BLANKET

BACKGROUND OF THE INVENTION

The present invention relates to a fibrous insulation blanket pre-cut for custom fitting the fibrous insulation blanket into cavities of different widths formed by the framework of a building, such as both standard and non-standard width wall, floor, ceiling or roof cavities formed in part by successive frame members; and, in particular, to a pre-cut fibrous insulation blanket with sections, held together by separable connectors, that can be handled as a unit when insulating a cavity of a certain predetermined width or easily separated or torn apart (by hand) along one or more cuts formed in the fibrous insulation blanket to form narrower blankets when insulating a cavity having a lesser width.

Building structures, such as residential houses, industrial buildings, office buildings, mobile homes, prefabricated buildings and similar structures typically include walls (both interior and exterior), ceilings, floors and roofs which are insulated for both thermal and acoustical purposes, especially the exterior walls, the ceilings below open attic spaces, and the roofs of such structures. The walls, ceilings, floors and roofs of these structures include framing members, e.g. studs, rafters, floor and ceiling joists, beams and similar support members, which are normally spaced-apart standard distances established by the building industry. Sheathing, paneling, lathing or similar construction materials are secured to these framing members to form the walls, ceilings, floors and roofs of the structures. While the contractor seeks to maintain the spacing of such framing members in these structures at these standard distances for ease of construction and the insulation of the elongated cavities formed in these walls, ceilings, floors, and roofs, frequently, the walls, ceilings, floors and/or roofs of these structures include elongated cavities defined, at least in part, by successive or adjacent framing members which are spaced apart a nonstandard distance less than the standard spacing between framing members. Studies have shown that in a typical residential house, it is common for 50% or more of the framing members in the exterior walls of these structures to be spaced apart at nonstandard distances less than the standard spacing for such framing members.

When insulating these elongated cavities of various nonstandard widths, less than a standard width, it has been the practice to take an insulation batt preformed to fit the standard cavity width and reduce the width of the insulation batt by cutting off and removing a strip of insulation material from one or both longitudinal edges of the insulation batt. U.S. Pat. No. 5,331,787; issued Jul. 26, 1994; to Kaarst; illustrates this approach. In the invention of this patent, the insulation batts or panels have widths at least equal to a predetermined maximum distance between adjacent support members defining the cavities that the batts or panels are to insulate. The batts or panels are provided with facings that are folded over along the longitudinal edges of the batts or panels so that strips of insulation material can be cut away from one or both longitudinal edges of the batts or panels to fit the batts or panels between support members spaced apart less than the predetermined maximum spacing. This method of trimming the insulation batts at the job site by cutting the batts to fit between the more closely spaced support members is time consuming, raises a significant risk or safety issue, relies heavily on the worker's skill to accurately trim the batt or panel.

U.S. Pat. No. 4,866,905; issued Sep. 19, 1989; to Bihy et al; discloses another approach to the problem. In the invention disclosed in this patent, a continuous strip of fibrous insulation with transverse marking lines is provided. The worker cuts the strip of fibrous insulation at the job site to a width somewhat greater than the spacing between framing members, i.e. rafters, defining the space to be insulated. Of course this method of forming insulation batts or panels at the job site is also time consuming and relies heavily on the skill of the worker cutting the insulation strip to achieve a good result.

A different approach to the problem is shown in U.S. Pat. No. 2,335,968; issued Dec. 7, 1943; to Sawtell. In the invention of this patent, the lateral edges of the insulation blanket are turned down to enable the insulation batt to be placed between framing members, i.e. rafters, spaced closer together than the width of the insulation batt. This approach does not require any cutting or trimming at the job site, but it can only be used where the spacing between the framing members is slightly less than the width of insulation blanket. In addition, the extra insulation material used to insulate cavities having less than a standard cavity width would add significantly to material costs.

Thus it can be seen that there has been a need to provide fibrous insulation blankets or batts which can be used to either insulate cavities of a predetermined width, such as but not limited to standard width framework cavities, or be quickly and easily reduced in width to fit cavities of lesser widths, such as less than standard width cavities, without a need to cut the fibrous insulation blankets at the job site with knives or similar cutting tools which is both time consuming and can result in cuts or other injuries to the workers.

SUMMARY OF THE INVENTION

The pre-cut fibrous insulation blanket of the present invention provides a solution to the above discussed problems. The pre-cut fibrous insulation blanket of the present invention is pre-cut for custom fitting the insulation blanket into building cavities of different widths formed by the framework of a building. The width of the pre-cut fibrous insulation blanket is normally equal to or substantially equal to the width of a standard cavity to be insulated by the pre-cut fibrous insulation blanket, e.g. about fourteen and one half to about fifteen inches or about twenty two and one half to about twenty three inches in width for a typical wall cavity. However, the pre-cut fibrous insulation blanket may also be initially formed at a selected width, e.g. about thirteen to about thirteen and one half inches, less than a standard cavity width.

Do to the compressibility and resilience of the pre-cut fibrous insulation blankets of the present invention (generally pre-cut glass fiber insulation blankets), the pre-cut fibrous insulation blankets can be fitted into cavities having a width up to about one and one half to about two inches less than the width of the pre-cut fibrous insulation blankets without removing any sections of the blankets, e.g. a pre-cut fibrous insulation blanket having a width between about fourteen and one half to about fifteen inches can be installed within a cavity having a width of about thirteen inches or greater. For cavities of lesser widths, greater than about one and one half to two inches less in width than the pre-cut fibrous insulation blankets, the pre-cut fibrous insulation blankets may have one or more sections removed from the blankets so that the remaining portions of the pre-cut fibrous insulation blankets will better fit into the cavities being insulated.

The pre-cut fibrous insulation blanket of the present invention has at least one (preferably, two, three or more)

cuts extending between a first major surface to a second major surface of the pre-cut fibrous insulation blanket. Each cut extends for the length of the pre-cut fibrous insulation blanket and is spaced inwardly from the lateral edges of the insulation blanket and laterally from any other cut in the pre-cut fibrous insulation blanket. The cut(s) separate the pre-cut fibrous insulation blanket into a plurality of longitudinally extending sections separated by the cut(s). Separable connectors hold together adjacent sections of the pre-cut fibrous insulation blanket for handling, but are separable by hand along the length of each cut whereby the pre-cut fibrous insulation blanket can be handled as a unit for insulating a cavity having a predetermined width, such as but not limited to a standard cavity width, or easily separated by hand into two or more sections at each cut and separable connector for insulating a cavity of lesser width, such as a cavity having less than a standard width.

Preferably the separable connectors are permeable sheets and/or facing sheets bonded to the major surfaces of the pre-cut fibrous insulation blanket and separable along the cuts and/or strips bonded to the major surfaces of the pre-cut fibrous insulation blankets and separable along the cuts or separable from the blanket along the cuts. A permeable sheet used as a separable connector typically overlays the entire major surface of the pre-cut fibrous insulation blanket to which the sheet is adhered; is permeable to water vapor; and, due to its lightweight and/or the presence of perforated lines in the sheet, may be easily torn apart by hand along the length(s) of the cut(s) in the pre-cut fibrous insulation blanket prior. A facing sheet used as a separable connector typically overlays the entire major surface of the pre-cut fibrous insulation blanket to which the sheet is adhered; is normally impermeable to water vapor; and, due to the presence of perforated lines, overlapping sections of the facing sheet which are separably bonded together, tear strings, or other separable means in the facing sheet, may be easily separated or torn apart by hand along length(s) of the cut(s) in the precut fibrous insulation blanket. A strip used as a separable connector typically overlays a cut, extends for the length of the cut; is bonded to a major surface of the pre-cut fibrous insulation blanket on both sides of the cut; and may be easily separated along the length of the cut or separated from the pre-cut fibrous insulation blanket along the length of the cut. Separable connectors formed of permeable sheets or strips may be used on both major surfaces of a pre-cut fibrous insulation blanket to separably join the sections of the pre-cut fibrous insulation blanket together when no vapor barrier is to be included in the pre-cut fibrous insulation blanket. When a pre-cut fibrous insulation blanket is to include a vapor barrier, a water vapor impermeable facing sheet is bonded to one of the major surfaces of the pre-cut fibrous insulation blanket and either a permeable sheet or one or more strips overlaying the cut(s) in the blanket are bonded to the other major surface of the pre-cut fibrous insulation blanket.

When used, the facing sheet of the pre-cut fibrous insulation blanket, preferably, has one or more perforated lines or overlapping tabs (tabs which are adhesively bonded together) and/or tear strings for permitting the facing to be separated at each cut in the pre-cut fibrous insulation blanket to facilitate separating or tearing apart the faced pre-cut insulation blanket by hand, if required. Preferably, the perforations of the perforated line(s) in the facing sheet are closed by the bonding agent bonding the facing sheet to the pre-cut fibrous insulation blanket. The filling of the perforations in the facing sheet with the bonding agent helps to reinforce or increase the integrity of the facing sheet at the perforations to prevent an unwanted separation of the facing sheet at the perforations and enables the facing sheet to function as a vapor barrier in spite of the perforations. Thus, the pre-cut fibrous insulation blanket with the facing sheet can still be quickly and easily modified to fit a cavity of a particular width without sacrificing the vapor barrier properties of the facing sheet.

Preferably, the facing sheet has tabs for securing the faced pre-cut fibrous insulation blanket to framing members, e.g. with mechanical fasteners such as staples or with an adhesive. These tabs may be located along each lateral edge of the pre-cut fibrous insulation blanket and facing sheet and pairs of tabs may be located adjacent each cut in the pre-cut fibrous insulation blanket with the perforated lines in the facing sheet or an adhesive layer separably joining the tabs of each pair of tabs.

With the faced or unfaced pre-cut fibrous insulation blanket of the present invention, the pre-cut fibrous insulation blanket can be quickly and easily sized to fit wall, floor, ceiling, roof and other building cavities formed by the framework of a building without the need to use cutting tools at the job site to cut the insulation. Thus, the use of the pre-cut fibrous insulation blanket of the present invention to insulate the wall, floor, ceiling and roof cavities of buildings, especially wall cavities, not only reduces safety concerns, but greatly speeds up the installation process. Since insulation installers are frequently paid by the piece, the present invention enables them to operate more profitably.

BRIEF DESCRIPTION OF THE DRAWINGS

FIG. 1 is a schematic elevation of the framework in an outside wall of a building with pre-cut fibrous insulation blankets of the present invention installed in standard width and less than standard width wall cavities defined by the frame members.

FIG. 2 is a schematic view of a major surface of a pre-cut fibrous insulation blanket of the present invention with three cuts in the fibrous insulation blanket and a permeable sheet, overlaying one of the major surfaces of the blanket, partially cut away for purposes of illustration.

FIG. 3 is a schematic end view of the pre-cut fibrous insulation blanket of FIG. 2.

FIG. 4 is a schematic view of a first major surface of a pre-cut fibrous insulation blanket of the present invention with a permeable sheet, that has perforated lines aligned with cuts in the blanket, overlaying the first major surface of the blanket.

FIG. 5 is a schematic end view of the pre-cut fibrous insulation blanket of FIG. 4.

FIG. 6 is a schematic view of the second major surface of the pre-cut fibrous insulation blanket of FIG. 4 with a facing sheet, that has perforated lines aligned with cuts in the blanket, overlaying the second major surface of the blanket.

FIG. 7 is a schematic view of a major surface of a pre-cut fibrous insulation blanket of the present invention with three cuts in the fibrous insulation blanket and the strips that overlay the three cuts partially cut away for purposes of illustration.

FIG. 8 is a schematic end view of the pre-cut fibrous insulation blanket of FIG. 7.

FIG. 9 is a schematic transverse cross section of a faced pre-cut fibrous insulation blanket of the present invention with a permeable sheet bonded to one major surface of the blanket and a facing sheet with integral tabs, formed by Z-pleats, bonded to the other major surface of the blanket that are both separable along each cut in the blanket.

FIG. 10 is a partial schematic transverse cross section, on a larger scale than FIG. 9, of the faced pre-cut fibrous insulation blanket of FIG. 9.

FIG. 11 is a partial schematic transverse cross section of the pre-cut fibrous insulation blanket of FIGS. 9 and 10 showing the faced pre-cut fibrous insulation blanket in the process of being separated along a cut.

FIG. 12 is a partial schematic transverse cross section of a faced pre-cut fibrous insulation blanket of the present invention showing a strip overlapping a cut and bonded to one major surface of the blanket and a facing sheet with integral tabs, formed by Z-pleats, bonded to the other major surface of the blanket that are both separable along the cut.

FIG. 13 is a partial schematic transverse cross section of a faced pre-cut fibrous insulation blanket of the present invention with a permeable sheet bonded to one major surface of the blanket and a facing sheet with integral tabs, formed by a pleat in the facing sheet inserted into the cut, bonded to the other major surface of the blanket that are both separable along the cut in the blanket.

FIG. 14 is a schematic transverse cross section of a faced pre-cut fibrous insulation blanket of the present invention with a permeable sheet bonded to one major surface of the blanket and a facing sheet with integral tabs, formed by overlapping lateral edge portions of a series of sheets forming the facing sheet, bonded to the other major surface of the blanket that are both separable along the cuts in the blanket.

FIG. 15 is a partial schematic transverse cross section, on a larger scale than FIG. 14, of the faced pre-cut fibrous insulation blanket of FIG. 14.

FIG. 16 is a partial schematic transverse cross section of a faced pre-cut fibrous insulation blanket of the present invention showing a strip overlapping a cut and bonded to one major surface of the blanket and a facing sheet with integral tabs, formed by overlapping lateral edge portions of a series of sheets forming the facing sheet, bonded to the other major surface of the blanket that are both separable along the cut.

FIG. 17 is a schematic transverse cross section of a faced pre-cut fibrous insulation blanket of the present invention with a permeable sheet bonded to one major surface of the blanket and a facing sheet with integral tabs in the facing sheet, formed by double Z-pleats, bonded to the other major surface of the blanket that are both separable along the cuts in the blanket.

FIG. 18 is a partial schematic transverse cross section, on a larger scale than FIG. 17, of the faced pre-cut fibrous insulation blanket of FIG. 17.

FIG. 19 is a partial schematic transverse cross section of a faced pre-cut fibrous insulation blanket of the present invention showing a strip overlapping a cut and bonded to one major surface of the blanket and a facing sheet with integral tabs in the facing sheet, formed by double Z-pleats, bonded to the other major surface of the blanket that are both separable along the cut in the blanket.

FIG. 20 is a partial schematic transverse cross section of the faced pre-cut fibrous insulation blanket of the present invention with a permeable sheet bonded to one major surface of the blanket and a facing sheet with tabs, formed by double Z-pleats in a separate sheet of facing material, bonded to the other major surface of the blanket that are both separable along the cut in the blanket.

DESCRIPTION OF THE PREFERRED EMBODIMENTS

FIG. 1 shows a portion of a typical outside wall of a residential house with a pre-cut, four section, fibrous insulation blanket 20 of the present invention installed in both standard width and non-standard width wall cavities of the outside wall. The widths of the wall cavities are defined by the framing members 22 (e.g. 2×4, 2×6 or 2×10 wall studs) which are spaced apart a standard distance (e.g. spaced apart on sixteen or twenty four inch centers) for standard width cavities 24 and less than the standard distance for non-standard width cavities 26. The cuts in the pre-cut fibrous insulation blanket, which are covered by a permeable sheet forming separable connectors of the pre-cut fibrous insulation blanket, are shown by dashed lines.

While the unfaced and faced pre-cut fibrous insulation blankets of the present invention may be made of other fibrous materials, preferably the unfaced and faced pre-cut fibrous insulation blankets of the present invention are made of glass fibers and typically have a density between about 0.4 pounds/ft$^3$ and about 1.5 pounds/ft$^3$. Examples of other fibers that may be used to form the unfaced and faced pre-cut fibrous insulation blankets of the present invention are mineral fibers, such as but not limited to, rock wool fibers, slag fibers, and basalt fibers, and organic fibers such as but not limited to polypropylene, polyester and other polymeric fibers. The fibers in the unfaced and faced pre-cut fibrous insulation blankets of the present invention may be bonded together for increased integrity, e.g. by a binder at their points of intersection such as but not limited to urea phenol formaldehyde or other suitable bonding materials, or the unfaced and faced pre-cut fibrous insulation blankets of the present invention may be binderless provided the blankets possess the required integrity.

Preferably, the unfaced and faced pre-cut fibrous insulation blankets of the present invention are resilient so that, after being compressed to insert the pre-cut fibrous insulation blanket or section(s) of the pre-cut fibrous insulation blanket into a cavity having a width somewhat less than the width of the pre-cut fibrous insulation blanket or the section(s) of the pre-cut fibrous insulation blanket being inserted into the cavity, the pre-cut fibrous insulation blanket or one or more sections of the pre-cut fibrous insulation blanket inserted into the cavity will expand to the width of the cavity and press against the sides of the cavity to hold or help hold the pre-cut fibrous insulation blanket or section(s) of the pre-cut fibrous insulation blanket in place.

Typically, for most applications, such as walls in residential houses, the resilient, unfaced and faced pre-cut fibrous insulation blankets of the present invention are delivered to the installer in the form of batts about forty six to about forty eight inches long or about ninety three inches long or in the form of rolls of various lengths greater than ninety three inches in length. Typically, the widths of the unfaced and faced pre-cut fibrous insulation blankets of the present invention are substantially equal to or equal to the standard cavity width to be insulated with the pre-cut fibrous insulation blankets, e.g. about fourteen and one half to about fifteen inches wide for a cavity where the standard center to center spacing of the wall, floor, ceiling or roof framing members is sixteen inches (the cavity has a width of about fourteen and one half inches) and about twenty two and one half to about twenty three inches wide for a cavity where the standard center to center spacing of the wall, floor, ceiling or roof framing members is twenty four inches (the cavity has a width of about twenty two and one half inches). However for certain applications, the pre-cut fibrous insulation blanket may have a different initial width, such as but not limited to about thirteen to about thirteen and one half inches.

The following examples illustrate how the faced or unfaced pre-cut fibrous insulation blanket of the present invention may be formed into sections. For a faced or unfaced pre-cut fibrous insulation blanket having a width of about fifteen inches which is divided into three sections, the sections may be about three and one-half, about five, and about six and one-half inches wide (from right to left or left to right). For a faced or unfaced pre-cut fibrous insulation blanket having a width of about fifteen inches which is divided into four sections, preferably, the sections are about two and one half, about four, about four, and about four and one half inches wide (from left to right or right to left). Another example of section widths for a pre-cut fibrous insulation blanket about fifteen inches wide is about three and one-half, about four and one-half, about five and one-half, and about one and one-half inches wide (from right to left or left to right). For a faced or unfaced pre-cut fibrous insulation blanket having a width of about twenty three inches which is divided into four sections, preferably, the sections are about eleven and one half, about four, about four, and about three and one half inches wide (from left to right or right to left). For a faced or unfaced pre-cut fibrous insulation blanket having a width of about twenty three inches which is divided into six sections, preferably, the sections are about three, about four, about four, about three, about four and about five inches wide (from left to right or right to left). For a faced or unfaced pre-cut fibrous insulation blanket about thirteen inches in width which is divided into three sections, the sections may be about three, about four and one half and about five and one half inches wide.

Note that the preferred slit configurations for the fifteen inch and twenty three inch wide pre-cut fibrous insulation blankets are designed to provide blanket pieces in widths that for the most part differ in roughly two inch increments. For example with the preferred 2½ inch, 4 inch, 4 inch and 4½ inch wide section configuration of a fifteen inch wide pre-cut fibrous insulation blanket, with one tear of the unfaced or faced pre-cut fibrous insulation blanket, a blanket 2½ inches, 4½ inches, 6½ inches, 8½ inches, 10½ inches or 12½ inches in width can be formed to fit a cavity of a particular width less than a standard cavity width. For example with the preferred 3 inch, 4 inch, 4 inch, 3 inch, 4 inch, and 5 inch wide section configuration of a twenty three inch wide pre-cut fibrous insulation blanket, with one tear of the unfaced or faced pre-cut fibrous insulation blanket, a blanket 3 inches, 5 inches, 7 inches, 9 inches, 11 inches, 12 inches, 14 inches, 15 inches, 18 inches, or 20 inches in width can be formed to fit a cavity of a particular width less than a standard cavity width. Insulation installers generally custom cut insulation blankets to be about 1 inch to about 1½ inches wider than the cavity being insulated and the blanket widths formed above essentially permit cavities of all widths to be insulated with a piece of insulation blanket about ½ of an inch to about 2 inches wider than the cavity being insulated without over compressing the insulation in the direction of its width. In both the fifteen inch and twenty three inch wide pre-cut fibrous insulation blankets, the ability to form blanket pieces which generally differ in width in about two inch increments was accomplished by making the two outer most sections two inches different in width and then making the inner sections, except for one of the central sections of the twenty three inch wide blanket about four inches in width.

The thicknesses of the unfaced and faced pre-cut fibrous insulation blankets of the present invention are determined by the amount of thermal resistance or sound control desired and the depth of the cavities being insulated. Typically, the pre-cut fibrous insulation blanket is about three to about ten inches or greater in thickness and approximates the depth of the cavity being insulated. For example, in a wall cavity defined in part by nominally 2×4 or 2×6 inch studs or framing members, a pre-cut fibrous insulation blanket will have a thickness of about three and one-half inches or about five and one-quarter inches, respectively.

The permeable sheets used to form the separable connectors in the pre-curt fibrous insulation blankets of the present invention are permeable or porous to water vapor. These permeable sheets may be made of various materials, such as but not limited to woven or nonwoven mats, scrims or nettings of cellulose fibers, polymeric fibers, glass fibers that are bonded, woven and/or entangled together; or sheets of porous polymeric films. Preferably, the permeable sheets are hydrophobic. The permeable sheets used to form the separators of the present invention are separable by hand i.e. the permeable sheets can be torn apart or separated by hand along the lengths of the cuts in the pre-cut fibrous insulation blanket without the need to resort to the use of knives or other cutting tools. The permeable sheets may be separable by hand along the lengths of the cuts in the pre-cut fibrous insulation blanket due to the low tear strength of the sheets with the permeable sheets, e.g. a tear strength of about one to about five pounds per linear inch or a tear strength about equal to the tear or tensile strength of facial or bathroom tissue. These permeable sheets might include but would not require the use of perforated lines, score lines, creases or other forms of lines of weakness or tear strings to facilitate the tearing or separation of the sheets by hand along the cuts. For permeable sheets having higher tear strengths that make the sheets less easily separable by hand, score lines, perforated lines, creases or other forms of lines of weakness may be formed in the permeable sheets or tear strings provided, that extend along the lengths of the cuts in the pre-cut fibrous insulation blanket, to make the permeable sheets easily separable by hand along the lengths of the cuts.

Examples of permeable sheets made of cellulose fibers which may be used as the permeable sheet of the present invention are: permeable sheets made by International Paper, Thilmany Division, and sold under the trade designation OTC 13229803 and permeable sheets made by Cascade Paper Co. and sold under the trade designation 40# Extensible Kraft. Examples of polymeric sheets made of polymeric fibers which may be used as the permeable sheet of the present invention are: permeable sheets made by Dupont Chemical Company and sold under the trade designations TYVEK 1025D and TYVEK 1073B. An example of a permeable sheet made of glass fibers which may be used as the permeable sheet of the present invention is a permeable sheet made by Protexa S.A. de C.V. and sold under the trade designation Protexa Glass 5OH. An example of a permeable sheet made of polymeric film which may be used as the permeable sheet of the present invention is a permeable sheet made by Vanguard Plastics Inc. and sold under the trade designation perforated coextruded polyethylene film.

The separable strips used to form the separable connectors for the pre-cut fibrous insulation blanket may be made of the same materials as the permeable sheets discussed above. However, the strips, which typically would be about one inch to about two and one half inches in width, do not have to be permeable for most applications. A strip may separate longitudinally along the length of a cut when the sections of the pre-cut fibrous insulation blanket, separably joined by the strip, are pulled apart to permit the sections to be separated from each other. The separation may take place by a longitudinal separation or tearing apart of the strip intermediate its lateral edges due to the low tear strength of the strip material or by a tearing or separation of the strip along a longitudinal line of weakness intermediate the lateral edges of the strip. The separation may also take place by a tearing away of a lateral portion of the strip from the pre-cut fibrous insulation blanket along one side of the cut which the strip overlays or a tearing away of lateral portions of the strip from both sides of the cut which the strip overlays. This separation may also take place at the bonding or adhesive layer bonding the strip to the surface of the pre-cut fibrous insulation blanket and/or may include a separation of a small portion of a surface layer of the fibrous blanket, adjacent the cut and bonded to the strip, from the remainder of the pre-cut fibrous insulation blanket. Fibrous insulation blankets are typically formed by successively dry laying thin layers of randomly oriented fibers one upon another to form a blanket with the layers extending in planes generally parallel to the major surfaces of the blankets. With this structure, a small portion of a surface layer of the pre-cut fibrous insulation blanket along a cut can be easily separated from the remainder of the insulation blanket.

The permeable sheets and the strips forming separable connectors for the pre-cut fibrous insulation blankets of the present invention may be bonded to the major surfaces of the pre-cut fibrous insulation blankets by hot melt adhesives, water based adhesives, and solvent based adhesives. Examples of hot melt adhesives are adhesives sold by Heartland Adhesives and Coatings under the trade designations Heartland H167 and H300-A7. Examples of water based adhesives are adhesives sold by Mon-Eco under the trade designation Mon-Eco DUM 22-68 and Foster Products Corporation under the trade designation JAC-TAC 85-62. An example of a solvent based adhesive is an adhesive sold by Mon-Eco under the trade designation Mon-Eco 22-42 HVAC. An example of a latex based adhesive is an adhesive sold by Johns Manville International, Inc. under the trade designation LAWX adhesive.

Preferably, the facings or facing sheets of the faced pre-cut fibrous insulation blankets of the present invention are impermeable to water vapor; are made of kraft paper, a foil-scrim-kraft paper laminate, a polymeric film, such as but not limited to polyethylene, or another facing material commonly used in the building insulation industry; and are bonded to a major surface of the pre-cut fibrous insulation blanket by a bonding agent. Preferably, the bonding agent for kraft paper or foil-scrim-kraft paper facings is an asphalt or other bituminous material that can be coated onto or otherwise applied to one side of the facing sheet just prior to applying the facing sheet to the pre-cut fibrous insulation blanket and the bonding agent for the polymeric film facing is a commercially available pressure sensitive adhesive that can be coated onto or otherwise applied to one side of the facing sheet just prior to applying the facing sheet to the pre-cut fibrous insulation blanket.

FIGS. 2 and 3 show an embodiment 20 of the pre-cut fibrous insulation blanket of the present invention. The pre-cut fibrous insulation blanket 20 has a length "L", a width "W" and a thickness "T". A first major surface 30 and a second major surface 32 of the pre-cut fibrous insulation blanket 20 are each defined by the width "W" and length "L" of the insulation blanket. There are one or more cuts, preferably two, three or more cuts (three cuts 34, 36 and 38 are shown) which each extend from the first major surface to the second major surface of the pre-cut fibrous insulation blanket and for the length of the pre-cut fibrous insulation blanket 20. Each cut divides the pre-cut fibrous insulation blanket 20 into blanket sections with the pre-cut fibrous insulation blanket being divided lengthwise into two or more blanket sections and, preferably, three, four or more blanket sections (four blanket sections 40, 42, 44 and 46 are shown) extending the length of the pre-cut fibrous insulation blanket.

A first permeable sheet 50 is bonded to the first major surface 30 of the pre-cut fibrous insulation blanket 20 and a second permeable sheet 52 is bonded to the second major surface 32 of the pre-cut fibrous insulation blanket by a bonding agent. The permeable sheets 50 and 52 of the pre-cut fibrous insulation blanket have a tear strength that enables the sheets to be easily separated or torn by hand along the lengths of the cuts 34, 36 and/or 38 without forming lines of weakness in the sheets or utilizing other means such as tear strings to facilitate the separation or tearing of the sheets along the cuts. However, the permeable sheets 50 and 52 could be provided with lines of weakness or tear strings, or permeable sheets, having a tensile or tear strength requiring lines of weakness or tear strings, could be substituted for sheets 50 and 52 and provided with lines of weakness, such as perforated lines, score lines or other lines of weakness or tear strings to facilitate the separation or tearing of the sheets along the cuts. The bonding agent may applied between the permeable sheets 50 and 52 and the major surfaces 30 and 32 of the pre-cut fibrous insulation blanket 20 in the form of permeable or porous adhesive layers 54 and 56 which are essentially coextensive with the major surfaces of the permeable sheets and the pre-cut fibrous insulation blanket or in the form of continuous or dashed strips, dots, or other patterns covering less than the entire surface areas of the sheets and blanket (e.g. about 5% to about 80% of the surface areas) provided the facing sheets are bonded to the major surfaces of the pre-cut fibrous insulation blankets along both sides of the each of the cuts in the blanket and along the lengths of each of the cuts in the blanket to hold the pre-cut fibrous insulation blanket 20 together for handling. With the portions of the permeable sheets 50 and 52, overlaying the cuts 34, 36 and 38, forming separable connectors joining the adjacent blanket sections 40, 42, 44 and 46 of the pre-cut fibrous insulation blanket 20 together, the pre-cut fibrous insulation blanket 20 can be handled as a unit for insulating a cavity having a predetermined width, such as but not limited to a thirteen inch width or a fourteen and one half or twenty two and one half standard cavity width, or easily separated by hand at one or more of the cuts 34, 36 and/or 38 by separating or tearing apart the permeable sheets 50 and 52 longitudinally along the cuts (separated without the need to use of a knife or other cutting tool) into one or more sections 40, 42, 44 and/or 46 for insulating a cavity having a lesser width, such as less than a standard cavity width.

FIGS. 4, 5 and 6 show an embodiment 120 of the pre-cut fibrous insulation blanket of the present invention. There are one or more cuts, preferably two, three or more cuts (three cuts 134, 136 and 138 are shown) which each extend from the first major surface 130 to the second major surface 132 of the pre-cut fibrous insulation blanket and for the length of the pre-cut fibrous insulation blanket 120. Each cut divides the pre-cut fibrous insulation blanket 120 into blanket sections with the pre-cut fibrous insulation blanket being divided lengthwise into two or more blanket sections and, preferably, three, four or more blanket sections (four blanket sections 140, 142, 144 and 146 are shown) extending the length of the pre-cut fibrous insulation blanket.

A permeable sheet 150 is bonded to the first major surface 130 of the pre-cut fibrous insulation blanket 120 and a facing sheet 152, preferably a water vapor impermeable facing sheet, is bonded to the second major surface 132 of the pre-cut fibrous insulation blanket by a bonding agent. As shown, the permeable sheet 150 has lines of weakness 158, 160 and 162 and the facing sheet 152 has lines of weakness 164, 166 and 168 (perforated lines of weakness are shown) that enable the permeable sheet 150 and the facing sheet 152 to be easily separated or torn apart by hand along the lengths of the cuts 134, 136 and/or 138. The bonding agent may applied between the permeable sheet 150 and the facing sheet 152 and the major surfaces 130 and 132 of the pre-cut fibrous insulation blanket 120 in the form of adhesive layers 154 and 156 which are essentially coextensive with the major surfaces of the permeable sheet, the facing sheet and the pre-cut fibrous insulation blanket or in the form of continuous or dashed strips, dots, or other patterns covering less than the entire surface areas of the sheets and blanket (e.g. about 5% to about 80% of the surface areas) provided the permeable sheet 150 and the facing sheet 152 are bonded to the major surfaces of the pre-cut fibrous insulation blanket along both sides of the each of the cuts in the blanket and along the lengths of each of the cuts in the blanket to hold the pre-cut fibrous insulation blanket 120 together for handling. Where the bonding layer is essentially coextensive with the major surfaces of the permeable sheet 150 and the major surface 130 of the pre-cut fibrous insulation blanket 120, the bonding layer is permeable or porous to water vapor. With the portions of the permeable sheet 150 and the facing sheet 152, overlaying the cuts 134, 136 and 138, forming separable connectors joining the adjacent blanket sections 140, 142, 144 and 146 of the pre-cut fibrous insulation blanket 120 together, the pre-cut fibrous insulation blanket 120 can be handled as a unit for insulating a cavity having a predetermined width, such as but not limited to a thirteen inch width or a fourteen and one half or twenty two and one half standard cavity width, or easily separated by hand at one or more of the cuts 134, 136 and/or 138 by separating or tearing apart the permeable sheet 150 and the facing sheet 152 longitudinally along the cuts (separated without the need to use of a knife or other cutting tool) into one or more sections 140, 142, 144 and/or 146 for insulating a cavity having a lesser width, such as less than a standard cavity width. As shown, the facing sheet 152 has lateral tabs 170.

FIGS. 7 and 8 show an embodiment 220 of the pre-cut fibrous insulation blanket of the present invention. There are one or more cuts, preferably two, three or more cuts (three cuts 234, 236 and 238 are shown) which each extend from the first major surface to the second major surface of the pre-cut fibrous insulation blanket and for the length of the pre-cut fibrous insulation blanket 220. Each cut divides the pre-cut fibrous insulation blanket 220 into blanket sections with the pre-cut fibrous insulation blanket being divided lengthwise into two or more blanket sections and, preferably, three, four or more blanket sections (four blanket sections 240, 242, 244 and 246 are shown) extending the length of the pre-cut fibrous insulation blanket.

A first series of strips 272 are bonded to the first major surface 230 of the pre-cut fibrous insulation blanket 220 and a second series of strips 274 are bonded to the second major surface 232 of the pre-cut fibrous insulation blanket by a bonding agent. The strips 272 and 274 of the pre-cut fibrous insulation blanket may have a tear strength that enables the strips to be easily separated or torn by hand along the lengths of the cuts 234, 236 and/or 238 without forming lines of weakness in the sheets; the strips 272 and 274 may be provided with longitudinally extending perforated lines, score lines or other lines of weakness intermediate the lateral edges of the strips to facilitate the separation or tearing of the strips along the cuts; and/or the strips may be bonded to the major surfaces of the blanket on each side of each cut so that the strip separates from the blanket at the adhesive layer bonding the strip to the blanket and/or by separating surface layer portions of the blanket adjacent the cuts from the remainder of the blanket.

The bonding agent may applied between the strips 272 and 274 and the major surfaces 230 and 232 of the pre-cut fibrous insulation blanket 220 in the form of adhesive layers 276 and 278 which are essentially coextensive with the major surfaces of the strips 272 and 274 or in the form of continuous or dashed strips, dots, or other patterns covering less than the entire surface areas of the strips (e.g. about 10% to about 80% of the surface areas) provided the strips are bonded to the major surfaces of the pre-cut fibrous insulation blankets along both sides of the each of the cuts in the blanket and along the lengths of each of the cuts in the blanket to hold the pre-cut fibrous insulation blanket 220 together for handling.

With the strips 272 and 274 overlaying the cuts 234, 236 and 238 and forming separable connectors joining the adjacent blanket sections 240, 242, 244 and 246 of the precut fibrous insulation blanket 220 together, the pre-cut fibrous insulation blanket 220 can be handled as a unit for insulating a cavity having a predetermined width, such as but not limited to a thirteen inch width or a fourteen and one half or twenty two and one half standard cavity width, or easily separated by hand at one or more of the cuts 234, 236 and/or 238 by separating or tearing apart the strips 272 and 274 (separating or tearing apart the strips between the lateral edges of the strips and/or from the blanket adjacent the cuts) longitudinally along the cuts (separated without the need to use of a knife or other cutting tool) into one or more sections 240, 242, 244 and/or 246 for insulating a cavity having a lesser width, such as less than a standard cavity width.

FIGS. 9, 10 and 11 show an embodiment 320 of the pre-cut fibrous insulation blanket of the present invention. There are one or more cuts, preferably two, three or more cuts (three cuts 334, 336 and 338 are shown) which extend from the first major surface 330 to the second major surface 332 of the pre-cut fibrous insulation blanket and for the length of the pre-cut fibrous insulation blanket 320. Each cut divides the pre-cut fibrous insulation blanket 320 into blanket sections with the pre-cut fibrous insulation blanket being divided lengthwise into two or more blanket sections and, preferably, three, four or more blanket sections (four blanket sections 340, 342, 344 and 346 are shown) extending the length of the pre-cut fibrous insulation blanket.

A permeable sheet 350 is bonded to the first major surface 330 of the pre-cut fibrous insulation blanket 320 and a facing sheet 352, preferably a water vapor impermeable facing sheet, is bonded to the second major surface 332 of the pre-cut fibrous insulation blanket by a bonding agent. The permeable sheet 350 and the facing sheet 352 of the pre-cut fibrous insulation blanket 320 may be easily separated or torn apart by hand along the lengths of the cuts 334, 336 and/or 338. The bonding agent may be applied between the permeable sheet 350 and the facing sheet 352 and the major surfaces 330 and 332 of the pre-cut fibrous insulation blanket 320 in the form of adhesive layers 354 and 356 which are essentially coextensive with the major surfaces of the permeable sheet, the facing sheet and the pre-cut fibrous insulation blanket or in the form of continuous or dashed strips, dots, or other patterns covering less than the entire surface areas of the sheets and blanket (e.g. about 5% to about 80% of the surface areas) provided the permeable sheet 350 and the facing sheet 352 are bonded to the major surfaces of the pre-cut fibrous insulation blanket along both sides of the each of the cuts in the blanket and along the lengths of each of the cuts in the blanket to hold the pre-cut fibrous insulation blanket 320 together for handling. Where the bonding layer is essentially coextensive with the major surfaces of the permeable sheet 350 and the major surface 330 of the pre-cut fibrous insulation blanker 320, the bonding layer is permeable or porous to water vapor.

With the portions of the permeable sheet 350 and the facing sheet 352 overlaying the cuts 334, 336 and 338 forming separable connectors joining the adjacent blanket sections 340, 342, 344 and 346 of the pre-cut fibrous insulation blanket 320 together, the pre-cut fibrous insulation blanket 320 can be handled as a unit for insulating a cavity having a predetermined width, such as but not limited to a thirteen inch width or a fourteen and one half or twenty two and one half standard cavity width, or easily separated by hand at one or more of the cuts 334, 336 and/or 338 by separating or tearing apart the permeable sheet 350 and the facing sheet 352 longitudinally along the cuts (separated without the need to use of a knife or other cutting tool) into one or more sections 340, 342, 344 and/or 346 for insulating a cavity having a lesser width, such as less than a standard cavity width.

The permeable sheet 350 may be separable by hand along the lengths of the cuts 334, 336 and 338 in the pre-cut fibrous insulation blanket due to the low tear strength of the sheets or the permeable sheet might include perforated lines, score lines, creases or other forms of lines of weakness or tear strings along the lengths of the cuts to facilitate the tearing apart or separation of the permeable sheet by hand along the cuts.

As shown in FIG. 9, the facing sheet 352 has lateral tabs 370 and pairs of tabs 380, 382 and 384 adjacent each of the cuts 334, 336 and 338 in the faced pre-cut fibrous insulation blanket 320 for stapling or otherwise securing the faced pre-cut fibrous insulation blanket or section(s) of the faced pre-cut fibrous insulation blanket to frame members. The lateral tabs 370, which preferably are formed by Z-shaped pleats in the facing 352, extend for the length of the faced pre-cut fibrous insulation blanket 320 and the pairs of tabs 380, 382 and 384 are longitudinally aligned with and extend for the lengths of the cuts 334, 336 and 338 of the faced pre-cut fibrous insulation blanket 320. Each pair of tabs 380, 382 and 384 is formed by a Z-shaped pleat in the facing sheet 352 with the tabs of each pair of tabs 380, 382 and 384 being separably connected to each other by perforated lines 364, 366 and 368, respectively so that the facing can be separated at each cut.

The spaced apart perforations of the perforated lines 364, 366 and 368 may be of various shapes, including but not limited to, round, oval, elongated, slit shaped, etc. and the spacing between perforations and the length of the perforations may vary as long as the facing is easily separated by hand along the line formed by the perforations. Preferably, the perforations of perforated lines 364, 366 and 368 in the pre-cut fibrous insulation blanket 320, are filled, e.g. with the bonding agent that bonds the facing sheet 352 to the major surface 332 of the faced pre-cut fibrous insulation blanket or a similar material, to close the perforations so that the facing sheet 352 functions as a vapor barrier. While perforations are preferred, tear strings could be used with or substituted for the perforated lines 364, 366 and 368. The tear strings would have a free end for gripping; be bonded to the facing by the bonding agent that bonds the facing to the blanket; and would extend along lines that coincide with the locations of the perforated lines 364, 366 and 368.

The use of pairs of tabs 380, 382 and 384 formed by Z-shaped pleats in the facing 352 wherein the tabs of each pair of tabs are separably bonded together by the bonding agent bonding the facing 352 to a major surface of the faced pre-cut fibrous insulation blanket provides several advantages: the overlapping and bonding together of the tabs across their widths in each pair of tabs with the perforations at the juncture of the tabs improves the vapor barrier properties of the perforated facing; there is less tendency for the facing 352 to split during installation because the bonding agent joining the tabs of each pair of tabs together can yield when the faced pre-cut fibrous insulation blanket is flexed; the folds at the perforations in the Z-shaped pleats facilitate the tearing of the facing 352 at the perforations and help prevent the tears from propagating out of the tabs; and, as shown in FIG. 11, as the blanket sections adjacent a pair of tabs are separated, the tabs which initially lie on a major surface of the blanket are pulled away from the major surface of the blanket to extend generally perpendicular to the major surface of the blanket for better grasping by a worker as the tabs peel away from each other and finally separate from each other along the perforated lines. In addition, the use of facing tabs adjacent the cuts between blanket sections, in this and other embodiments of the invention, not only provides tabs for securing the blanket sections in place, but also enables the facings to provide vapor barriers across the entire widths of blanket sections even when the means for separating the facings along each of the cuts, e.g. perforated lines, are not properly aligned with each of the cuts.

The integral tabs adjacent each cut plus lateral tabs, such as the lateral tabs shown in FIG. 9, can be used to secure the faced pre-cut fibrous insulation blanket 320 or blanket sections of the faced pre-cut fibrous insulation blanket 320 to framing members, by stapling or other conventional means, either as a unit or as one or more sections when one or more blanket sections are separated from the remainder of the faced pre-cut fibrous insulation blanket. Preferably, the tabs are about three eights to about one and one half inches in width. When securing the faced pre-cut fibrous insulation blanket 320 or one or more blanket sections of the faced pre-cut fibrous insulation blanket to framing members, the tabs adjacent the series of cuts and separable connectors and lateral tabs used to secure the blanket are at least partially unfolded and extended outward from the faced pre-cut fibrous insulation blanket or blanket sections of the faced pre-cut fibrous insulation blanket prior to stapling or otherwise securing the tabs to the framing members.

FIG. 12 is a partial transverse cross section of an embodiment 420 of the faced pre-cut fibrous insulation blanket of the present invention through one of the cuts 434 in the insulation blanket; a strip 472 overlaying the cut 434 and bonded to the major surface 430 of the pre-cut fibrous insulation blanket by an adhesive layer 454; and a portion of a facing sheet 452, with a pair of tabs 480 joined by a perforated line 464 adjacent the cut 434, which overlays and is bonded to the major surface 432 of the faced pre-cut fibrous insulation blanket by an adhesive layer 456. Except for the use of strips 472 rather than a permeable sheet 350, the pre-cut fibrous insulation blanket 420 is the same as the pre-cut fibrous insulation blanket 320. The strips 472 of the pre-cut fibrous insulation blanket may have a tear strength that enables the strips 472 to be easily separated or torn by hand along the lengths of the cuts in the blanket without forming lines of weakness in the sheets; the strips 472 may be provided with longitudinally extending perforated lines, score lines or other lines of weakness intermediate the lateral edges of the strips to facilitate the separation or tearing of the strips along the cuts; and/or the strips may be bonded to the major surfaces of the blanket on each side of each cut so that the strip separates from the blanket at the adhesive layer 454 bonding the strip to the blanket and/or by separating surface layer portions of the blanket adjacent the cuts from the remainder of the blanket.

With the strips 472 and the portions of the facing sheet 452 overlaying the cuts in the blanket forming separable connectors joining the adjacent blanket sections of the pre-cut fibrous insulation blanket 420 together, the pre-cut fibrous insulation blanket 420 can be handled as a unit for insulating a cavity having a predetermined width, such as but not limited to a thirteen inch width or a fourteen and one half or twenty two and one half standard cavity width, or easily separated by hand at one or more of the cuts by separating or tearing apart the strip(s) and the facing sheet 452 longitudinally along the cuts (separated without the need to use of a knife or other cutting tool) into one or more sections for insulating a cavity having a lesser width, such as less than a standard cavity width. The tabs on the facing sheet 452 enable the pre-cut fibrous insulation blanket 420 or sections of the pre-cut fibrous insulation blanket 420 to be easily secured to framing members.

FIG. 13 is a partial transverse cross section of an embodiment 520 of the faced pre-cut fibrous insulation blanket of the present invention through one of the cuts 534 in the insulation blanket, a portion of a permeable sheet 550 overlaying and bonded to the major surface 530 of the pre-cut fibrous insulation blanket, and a portion of a facing sheet 552 overlaying and bonded to the major surface 532 of the faced pre-cut fibrous insulation blanket. Except for of a facing sheet with pairs of tabs inserted into the cuts dividing the pre-cut fibrous insulation blanket into sections rather than the facing sheet 352 of the pre-cut fibrous insulation blanket 320, the pre-cut fibrous insulation blanket 520 is the same as the pre-cut fibrous insulation blanket 320. The facing sheet 552 is provided with a pair of tabs 580 adjacent and extending for the length of the cut 534 which are tucked into the cut. The tabs of the pair of tabs 580 are joined together along a perforated line 564 so that the tabs can be separated from each other along the cut 534 when the sections 540 and 542 are to be separated from each other. An identical pair of tabs are provided adjacent any additional cuts in the pre-cut fibrous insulation blanket which divide the pre-cut fibrous insulation blanket into additional sections.

With the portions of the permeable sheet 550 and the facing sheet 552 overlaying the cuts in the blanket forming separable connectors joining the adjacent blanket sections of the pre-cut fibrous insulation blanket 520 together, the pre-cut fibrous insulation blanket 520 can be handled as a unit for insulating a cavity having a predetermined width, such as but not limited to a thirteen inch width or a fourteen and one half or twenty two and one half standard cavity width, or easily separated by hand at one or more of the cuts in the blanket by separating or tearing apart the permeable sheet 550 and the facing sheet 552 longitudinally along the cuts (separated without the need to use of a knife or other cutting tool) into one or more sections for insulating a cavity having a lesser width, such as less than a standard cavity width. The tabs on the facing sheet 552 enable the pre-cut fibrous insulation blanket 520 or sections of the pre-cut fibrous insulation blanket 520 to be easily secured to framing members.

FIGS. 14 and 15 show an embodiment 620 of the pre-cut fibrous insulation blanket of the present invention. There are one or more cuts, preferably two, three or more cuts (three cuts 634, 636 and 638 are shown) which extend from the first major surface 630 to the second major surface 632 of the pre-cut fibrous insulation blanket and for the length of the pre-cut fibrous insulation blanket 620. Each cut divides the pre-cut fibrous insulation blanket 620 into blanket sections with the pre-cut fibrous insulation blanket being divided lengthwise into two or more blanket sections and, preferably, three, four or more blanket sections (four blanket sections 640, 642, 644 and 646 are shown) extending the length of the pre-cut fibrous insulation blanket.

A permeable sheet 650 is bonded to the first major surface 630 of the pre-cut fibrous insulation blanket 620 and a facing sheet 652, preferably a water vapor impermeable facing sheet, is bonded to the second major surface 632 of the pre-cut fibrous insulation blanket by a bonding agent. The permeable sheet 650 and the facing sheet 652 of the pre-cut fibrous insulation blanket 620 may be easily separated or torn apart by hand along the lengths of the cuts 634, 636 and/or 638. The bonding agent may be applied between the permeable sheet 650 and the facing sheet 652 and the major surfaces 630 and 632 of the pre-cut fibrous insulation blanket 620 in the form of adhesive layers 654 and 656 which are essentially coextensive with the major surfaces of the permeable sheet, the facing sheet and the pre-cut fibrous insulation blanket or in the form of continuous or dashed strips, dots, or other patterns covering less than the entire surface areas of the sheets and blanket (e.g. about 5% to about 80% of the surface areas) provided the permeable sheet 650 and the facing sheet 652 are bonded to the major surfaces of the pre-cut fibrous insulation blanket along both sides of the each of the cuts in the blanket and along the lengths of each of the cuts in the blanket to hold the pre-cut fibrous insulation blanket 620 together for handling. Where the bonding layer is essentially coextensive with the major surfaces of the permeable sheet 650 and the major surface 630 of the pre-cut fibrous insulation blanker 620, the bonding layer is permeable or porous to water vapor.

With the portions of the permeable sheet 650 and the facing sheet 652, overlaying the cuts 634, 636 and 638, forming separable connectors joining the adjacent blanket sections 640, 642, 644 and 646 of the pre-cut fibrous insulation blanket 620 together, the pre-cut fibrous insulation blanket 620 can be handled as a unit for insulating a cavity having a predetermined width, such as but not limited to a thirteen inch width or a fourteen and one half or twenty two and one half standard cavity width, or easily separated by hand at one or more of the cuts 634, 636 and/or 638 by separating or tearing apart the permeable sheet 650 and the facing sheet 652 longitudinally along the cuts (separated without the need to use of a knife or other cutting tool) into one or more sections 640, 642, 644 and/or 646 for insulating a cavity having a lesser width, such as less than a standard cavity width.

The permeable sheet 650 may be separable by hand along the lengths of the cuts 634, 636 and 638 in the pre-cut fibrous insulation blanket due to the low tear strength of the sheets or the permeable sheet might include perforated lines, score lines, creases or other forms of lines of weakness or tear strings along the lengths of the cuts to facilitate the tearing apart or separation of the permeable sheet by hand along the cuts.

The facing or facing sheet 652 is formed by the series of overlapping sheets 686. As shown in FIG. 14, the facing sheet 652 has lateral tabs 670 and pairs of tabs 680, 682 and 684, adjacent each cut in the faced pre-cut fibrous insulation blanket 620 for stapling or otherwise securing the faced pre-cut fibrous insulation blanket or section(s) of the faced pre-cut fibrous insulation blanket to frame members. The lateral tabs 670 extend for the length of the faced pre-cut fibrous insulation blanket 620. The pairs of tabs 680, 682 and 684 are aligned or substantially aligned longitudinally with and extend for the lengths of each cut 634, 636 and 638 in the faced pre-cut fibrous insulation blanket 620. Each pair of tabs 680, 682 and 684 is formed by a lateral edge portion of a preceding sheet 686 overlapping a lateral edge portion of a succeeding sheet 686 at each of the cuts 634, 636 and 638 in the faced pre-cut fibrous insulation blanket 620 with both lateral portions of the sheets extending laterally beyond the cuts in opposite directions as shown in FIGS. 14 and 15. The tabs of each pair of tabs 680, 682 and 684 are separably bonded together by the bonding agent bonding the facing sheet to the major surface 632 or a similar adhesive so that the facing can be separated at each of the cuts.

Preferably, the lateral edge portions of the sheets 686 forming the facing sheet 652 are bonded together e.g. with the bonding agent that bonds the facing sheet 652 to the major surface 632 of the pre-cut fibrous insulation blanket or a similar material, so that the facing sheet 652 functions as a vapor barrier. The pairs of tabs 680, 682 and 684 adjacent the cuts 634, 636 and 638 in the faced pre-cut fibrous insulation blanket 620 plus lateral tabs, such as the lateral tabs 670 shown in FIG. 14, can be used to secure the sections 640, 642, 644 and 646 of the faced pre-cut fibrous insulation blanket 620 to framing members, by stapling or other conventional means, either as a unit or as one or more sections when one or more sections 640, 642, 644 and 646 are separated from the remainder of the faced pre-cut fibrous insulation blanket. Preferably, each tab is about three eights of an inch to about one and one half inches wide. When securing the faced pre-cut fibrous insulation blanket 620 or one or more sections 640, 642, 644 and 646 of the faced pre-cut fibrous insulation blanket to framing members, the pairs tabs 680, 682 and 684 and lateral tabs 670 used to secure the blanket are extended outward from the faced pre-cut fibrous insulation blanket 620 or sections 640, 642, 644 and 646 of the faced pre-cut fibrous insulation blanket prior to stapling or otherwise securing the tabs to the framing members.

FIG. 16 is a partial transverse cross section of an embodiment 720 of the faced pre-cut fibrous insulation blanket of the present invention through one of the cuts 734 in the insulation blanket, a strip 772 overlaying the cut 734 and bonded to the major surface 730 of the pre-cut fibrous insulation blanket by an adhesive layer 754, and a portion of a facing sheet 752, with a pair of tabs 780 adjacent the cut 734, which overlays and is bonded to the major surface 732 of the faced pre-cut fibrous insulation blanket by the adhesive layer 756. Except for the use of strips 772 rather than a permeable sheet 650, the pre-cut fibrous insulation blanket 720 is the same as the pre-cut fibrous insulation blanket 620. The strips 772 of the pre-cut fibrous insulation blanket may have a tear strength that enables the strips to be easily separated or torn by hand along the lengths of the cuts in the blanket without forming lines of weakness in the sheets; the strips 772 may be provided with longitudinally extending perforated lines, score lines or other lines of weakness intermediate the lateral edges of the strips to facilitate the separation or tearing of the strips along the cuts; and/or the strips may be bonded to the major surfaces of the blanket on each side of each cut so that the strip separates from the blanket at the adhesive layer bonding the strip to the blanket and/or by separating surface layer portions of the blanket adjacent the cuts from the remainder of the blanket.

With the strips 772 and the portions of the facing sheet 752 overlaying the cuts in the blanket forming separable connectors joining the adjacent blanket sections of the pre-cut fibrous insulation blanket 720 together, the pre-cut fibrous insulation blanket 720 can be handled as a unit for insulating a cavity having a predetermined width, such as but not limited to a thirteen inch width or a fourteen and one half or twenty two and one half standard cavity width, or easily separated by hand at one or more of the cuts by separating or tearing apart the strip(s) and the facing sheet 752 longitudinally along the cuts (separated without the need to use of a knife or other cutting tool) into one or more sections for insulating a cavity having a lesser width, such as less than a standard cavity width. The tabs on the facing sheet 752 enable the pre-cut fibrous insulation blanket 720 or sections of the pre-cut fibrous insulation blanket 720 to be easily secured to framing members.

FIGS. 17 and 18 show an embodiment 820 of the pre-cut fibrous insulation blanket of the present invention. There are one or more cuts, preferably two, three or more cuts (three cuts 834, 836 and 838 are shown) which extend from the first major surface 830 to the second major surface 832 of the pre-cut fibrous insulation blanket and for the length of the pre-cut fibrous insulation blanket 820. Each cut divides the pre-cut fibrous insulation blanket 820 into blanket sections with the pre-cut fibrous insulation blanket being divided lengthwise into two or more blanket sections and, preferably, three, four or more blanket sections (four blanket sections 840, 842, 844 and 846 are shown) extending the length of the pre-cut fibrous insulation blanket.

A permeable sheet 850 is bonded to the first major surface 830 of the pre-cut fibrous insulation blanket 820 and a facing sheet 852, preferably a water vapor impermeable facing sheet, is bonded to the second major surface 832 of the pre-cut fibrous insulation blanket by a bonding agent. The permeable sheet 850 and the facing sheet 852 of the pre-cut fibrous insulation blanket 820 may be easily separated or torn apart by hand along the lengths of the cuts 834, 836 and/or 838. The bonding agent may be applied between the permeable sheet 850 and the facing sheet 852 and the major surfaces 830 and 832 of the pre-cut fibrous insulation blanket 820 in the form of adhesive layers 854 and 856 which are essentially coextensive with the major surfaces of the permeable sheet, the facing sheet and the pre-cut fibrous insulation blanket or in the form of continuous or dashed strips, dots, or other patterns covering less than the entire surface areas of the sheets and blanket (e.g. about 5% to about 80% of the surface areas) provided the permeable sheet 850 and the facing sheet 852 are bonded to the major surfaces of the pre-cut fibrous insulation blanket along both sides of the each of the cuts in the blanket and along the lengths of each of the cuts in the blanket to hold the pre-cut fibrous insulation blanket 820 together for handling. Where the bonding layer is essentially coextensive with the major surfaces of the permeable sheet 850 and the major surface 830 of the pre-cut fibrous insulation blanker 820, the bonding layer is permeable or porous to water vapor.

With the portions of the permeable sheet 850 and the facing sheet 852 overlaying the cuts 834, 836 and 838 forming separable connectors joining the adjacent blanket sections 840, 842, 844 and 846 of the pre-cut fibrous insulation blanket 820 together, the pre-cut fibrous insulation blanket 820 can be handled as a unit for insulating a cavity having a predetermined width, such as but not limited to a thirteen inch width or a fourteen and one half or twenty two and one half standard cavity width, or easily separated by hand at one or more of the cuts 834, 836 and/or 838 by separating or tearing apart the permeable sheet 850 and the facing sheet 852 longitudinally along the cuts (separated without the need to use of a knife or other cutting tool) into one or more sections 840, 842, 844 and/or 846 for insulating a cavity having a lesser width, such as less than a standard cavity width.

The permeable sheet 850 may be separable by hand along the lengths of the cuts 834, 836 and 838 in the pre-cut fibrous insulation blanket due to the low tear strength of the sheets or the permeable sheet might include perforated lines, score lines, creases or other forms of lines of weakness or tear strings along the lengths of the cuts to facilitate the tearing apart or separation of the permeable sheet by hand along the cuts.

As shown in FIG. 17, the facing sheet 852 has lateral tabs 870 and pairs of tabs 880, 882 and 884 adjacent each of the cuts 834, 836 and 838 in the faced pre-cut fibrous insulation blanket 820 for stapling or otherwise securing the faced pre-cut fibrous insulation blanket or section(s) of the faced pre-cut fibrous insulation blanket to frame members. The lateral tabs 870, which preferably are formed by Z-shaped pleats in the facing 852, extend for the length of the faced pre-cut fibrous insulation blanket 820 and the pairs of tabs 880, 882 and 884 are longitudinally aligned with and extend for the lengths of the cuts 834, 836 and 838 of the faced pre-cut fibrous insulation blanket 820. The pairs of tabs 880, 882 and 884 are each formed by a double Z-shaped pleat in the facing 852 with the tabs of each pair of tabs being joined together along a perforated lines 864, 866 and 868 in the facing that are aligned with the cuts 834, 836 and 838 so that the tabs of each pair of tabs can be separated from each other at the cuts when the blanket sections 840, 842, 844 and/or 846 are separated from each other. Each tab is formed by twice folding the facing sheet 852 back upon itself into a Z-shaped pleat.

The spaced apart perforations of the perforated lines 864, 866 and 868 may be of various shapes, including but not limited to, round, oval, elongated, slit shaped, etc., and the spacing between perforations and the length of the perforations may vary as long as the facing is easily separated by hand along the line(s) formed by the perforations. Preferably, the perforations of perforated lines in the facing 852 of the faced pre-cut fibrous insulation blanket 820 are filled, e.g. with the bonding agent that bonds the facing sheet 852 to a major surface of the pre-cut fibrous insulation blanket or a similar material, to close the perforations so that the facing sheet 852 functions as a vapor barrier. While perforations are preferred, tear strings could be used with or substituted for the perforated lines 864, 866 and 868. The tear strings would have a free end for gripping; be bonded to the facing by the bonding agent that bonds the facing to the blanket; and would extend along lines that coincide with the locations of the perforated lines 864, 866 and 868.

The integral pairs of tabs 880, 882 and 884 adjacent each series of cuts and separable connectors plus lateral tabs, such as the lateral tabs 870 shown in FIG. 17, can be used to secure the faced pre-cut fibrous insulation blanket 820 or blanket sections of the faced pre-cut fibrous insulation blanket 820 to framing members, by stapling or other conventional means, either as a unit or as one or more sections when one or more blanket sections are separated from the remainder of the faced pre-cut fibrous insulation blanket. Preferably, the tabs are about three eights to about one and one half inches in width. When securing the faced pre-cut fibrous insulation blanket 820 or one or more blanket sections of the faced pre-cut fibrous insulation blanket to framing members, the tabs adjacent the series of cuts and separable connectors and lateral tabs used to secure the blanket are at least partially unfolded and extended outward from the faced pre-cut fibrous insulation blanket or blanket sections of the faced pre-cut fibrous insulation blanket prior to stapling or otherwise securing the tabs to the framing members.

FIG. 19 is a partial transverse cross section of an embodiment 920 of the faced pre-cut fibrous insulation blanket of the present invention through one of the cuts 934 in the insulation blanket, a strip 972 overlaying the cut 934 and bonded to the major surface 930 of the pre-cut fibrous insulation blanket by an adhesive layer 954, and a portion of a facing sheet 952, with a pair of tabs 980 joined by a perforated line 964 adjacent the cut 934, which overlays and is bonded to the major surface 932 of the faced pre-cut fibrous insulation blanket by an adhesive layer 956. Except for the use of strips 972 rather than a permeable sheet 950, the pre-cut fibrous insulation blanket 920 is the same as the pre-cut fibrous insulation blanket 920. The strips 972 of the pre-cut fibrous insulation blanket may have a tear strength that enables the strips to be easily separated or torn by hand along the lengths of the cuts in the blanket without forming lines of weakness in the sheets; the strips 972 may be provided with longitudinally extending perforated lines, score lines or other lines of weakness intermediate the lateral edges of the strips to facilitate the separation or tearing of the strips along the cuts; and/or the strips may be bonded to the major surfaces of the blanket on each side of each cut so that the strip separates from the blanket at the adhesive layer 954 bonding the strip to the blanket and/or by separating surface layer portions of the blanket adjacent the cuts from the remainder of the blanket.

With the strips 972 and the portions of the facing sheet 952 overlaying the cuts in the blanket forming separable connectors joining the adjacent blanket sections of the pre-cut fibrous insulation blanket 920 together, the pre-cut fibrous insulation blanket 920 can be handled as a unit for insulating a cavity having a predetermined width, such as but not limited to a thirteen inch width or a fourteen and one half or twenty two and one half standard cavity width, or easily separated by hand at one or more of the cuts by separating or tearing apart the strip(s) and the facing sheet 952 longitudinally along the cuts (separated without the need to use of a knife or other cutting tool) into one or more sections for insulating a cavity having a lesser width, such as less than a standard cavity width. The tabs on the facing sheet 952 enable the pre-cut fibrous insulation blanket 920 or sections of the pre-cut fibrous insulation blanket 920 to be easily secured to framing members.

FIG. 20 is a partial transverse cross section of an embodiment 1020 of the faced pre-cut fibrous insulation blanket of the present invention through one of the cuts 1034 in the insulation blanket, a portion of a permeable sheet 1050 overlaying and bonded to the major surface 1030, and a portion of the facing 1052 overlaying and bonded to the major surface 1032 of the faced pre-cut fibrous insulation blanket. Except for the structure of the tabs and facing sheet adjacent each of the cuts in the blanket, the faced pre-cut fibrous insulation blanket 1020 of FIG. 20 is the same as the faced pre-cut insulation blanket 820 of FIGS. 17 and 18. As shown, the facing 1052 is provided with a cut or perforated line 1064. The perforated line 1064 is aligned with and extends for the length of the cut 1034 so that the facing 1052 can be separated at the cut. A separate sheet of facing material 1090 is bonded by a bonding agent 1092 to the facing 1052 on either side of the perforated line 1064 and extends for the length of the perforated line. The sheet 1090 has a pair of tabs 1080 adjacent and extending for the length of the cut 1034 in the pre-cut fibrous insulation blanket. The pair of tabs 1080 are formed by a double Z-shaped pleat in the facing material 1090 with the tabs 1080 being joined together along a perforated line 1094 that is aligned with the cut 1034 so that the tabs can be separated from each other at the cut 1034 when the blanket sections 1040 and 1042 are separated from each other. Each tab of the pair of tabs 1080 is formed by twice folding the sheet 1090 of facing material back upon itself into a Z-shaped pleat, and identical pairs of integral tabs are located adjacent and extend for the length of the each additional cut in the faced pre-cut fibrous insulation blanket 1020, dividing blanket sections of the faced pre-cut fibrous insulation blanket. With this structure, the faced pre-cut fibrous insulation blanket 1020 can be handled as a unit for insulating a cavity having a predetermined cavity width, such as but not limited to a thirteen inch width or a fourteen and one half or twenty two and one half inch standard cavity width, or easily separated or torn apart by hand into one or more blanket sections by separating or tearing apart the permeable sheet and the facing sheet of the pre-cut fibrous insulation blanket 1020 at any one or more of the cuts (separated without the need to use of a knife or other cutting tool) for insulating a cavity having lesser width, e.g. less than a standard cavity width.

The spaced apart perforations of the perforated lines in the facing sheet 1052 and the sheet 1090 may be of various shapes, including but not limited to, round, oval, elongated, slit shaped, etc., and the spacing between perforations and the length of the perforations may vary as long as the facing is easily separated by hand along the line(s) formed by the perforations. Preferably, the perforations of perforated lines in the facing 1052 and between the tabs adjacent each cut in the faced pre-cut fibrous insulation blanket 1020 are filled, e.g. with the bonding agents that bond the facing sheet 1052 to a major surface of the pre-cut fibrous insulation blanket and the sheet of facing material 1090 to the facing sheet 1052 or a similar material, to close the perforations so that the facing sheet 1052 functions as a vapor barrier.

The tabs adjacent each cut plus lateral tabs, such as the lateral tabs 870 shown in FIG. 17, can be used to secure the faced pre-cut fibrous insulation blanket 1020 or blanket sections of the faced pre-cut fibrous insulation blanket 1020 to framing members, by stapling or other conventional means, either as a unit or as one or more blanket sections when one or more blanket sections are separated from the remainder of the faced pre-cut fibrous insulation blanket. Preferably, the tabs are about three eights to about one and one half inches in width. When securing the faced pre-cut fibrous insulation blanket 1020 or one or more blanket sections of the faced pre-cut fibrous insulation blanket to framing members, the tabs adjacent the series of cuts and separable connectors and lateral tabs used to secure the blanket are at least partially unfolded and extended outward from the faced pre-cut fibrous insulation blanket or blanket sections of the faced pre-cut fibrous insulation blanket prior to stapling or otherwise securing the tabs to the framing members.

As an example of the versatility of the pre-cut fibrous insulation blankets 20 to 1020, the preferred different widths of the sections, when three sections are formed in a fifteen inch wide embodiment of the invention, enable the pre-cut fibrous insulation blankets 20 to 1020 to be quickly and easily formed into widths of about three and one-half inches (e.g. section 44), five inches (e.g. section 46), six and one-half inches (e.g. section 48), eight and one-half inches (e.g. sections 34 and 46) and eleven and one-half inches (e.g. sections 46 and 48). Where the pre-cut fibrous insulation blanket is separated into four or more sections, the installer has even more options. Thus, the pre-cut fibrous insulation blankets 20 to 1020 can not only be used to insulate cavities having standard widths, but the width of the pre-cut fibrous insulation blanket can also be quickly and easily modified to fit cavities of various non-standard widths. The use of a resilient fibrous insulation blanket 20 to 1020, such as a resilient glass fiber insulation blanket, further enhances the ability of the pre-cut fibrous insulation blanket to conform to various cavity widths.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A pre-cut fibrous insulation blanket for custom fitting the insulation blanket into cavities of different widths formed by building framework, comprising:

an elongated fibrous insulation blanket; the fibrous insulation blanket having a length, a width and a thickness; the fibrous insulation blanket having a first major surface and a second major surface which each extend for the length and width of the fibrous insulation blanket; the fibrous insulation blanket having a first cut extending from the first major surface to the second major surface of the fibrous insulation blanket; the first cut extending for the length of the fibrous insulation blanket and being spaced inwardly from both lateral edges of the fibrous insulation blanket; the fibrous insulation blanket having adjacent, longitudinally extending sections separated by the first cut; a first separable connector holding the adjacent sections of the fibrous insulation blanket separated by the first cut together adjacent the first major surface of the fibrous insulation blanket for handling and being separable by hand along the length of the first cut whereby the fibrous insulation blanket can be handled as a unit for insulating a cavity having a width about equal to the width of the pre-cut fibrous insulation blanket or easily separated by hand into sections at the first cut for insulating a cavity having a width less than the width of the pre-cut fibrous insulation blanket.

2. The pre-cut fibrous insulation blanket according to claim 1, wherein:

the first separable connector is a portion of a sheet, overlaying and bonded to the first major surface of the fibrous insulation blanket on each side of the first cut, which is separable by hand along the length of the first cut.

3. The pre-cut fibrous insulation blanket according to claim 1, wherein:

the first separable connector is a strip extending along the length of the first cut which is bonded to the first major surface of the fibrous insulation blanket on each side of the first cut.

4. The pre-cut fibrous insulation blanket according to claim 1, wherein:

a second separable connector holds the adjacent sections of the fibrous insulation blanket separated by the first cut together adjacent the second major surface of the fibrous insulation blanket for handling and is separable by hand along the length of the first cut whereby the fibrous insulation blanket can be handled as a unit for insulating a cavity having a width about equal to the width of the pre-cut fibrous insulation blanket or easily separated by hand into sections at the first cut for insulating a cavity having a width less than the width of the pre-cut fibrous insulation blanket.

5. The pre-cut fibrous insulation blanket according to claim 4, wherein:

the first separable connector is a portion of a first sheet, overlaying and bonded to the first major surface of the fibrous insulation blanket on each side of the first cut, which is separable by hand along the length of the first cut; and the second separable connector is a portion of a second sheet, overlaying and bonded to the second major surface of the fibrous insulation blanket on each side of the first cut, which is separable by hand along the length of the first cut.

6. The pre-cut fibrous insulation blanket according to claim 5, wherein:

the first sheet with the first separable connector is permeable to moisture.

7. The pre-cut fibrous insulation blanket according to claim 6, wherein:

the first sheet with the first separable connector is a light weight fibrous mat.

8. The pre-cut fibrous insulation blanket according to claim 6, wherein:

the first sheet with the first separable connector is a polymeric sheet.

9. The pre-cut fibrous insulation blanket according to claim 4, wherein:

the first separable connector is a portion of a first sheet, overlaying and bonded to the first major surface of the fibrous insulation blanket on each side of the first cut, which is weakened along a line extending the length of the first cut to be separable by hand along the length of the first cut; and the second separable connector is a portion of a second sheet overlaying and bonded to the second major surface of the fibrous insulation blanket on each side of the first cut.

10. The pre-cut fibrous insulation blanket according to claim 9, wherein:

the line of weakness in the first sheet is a perforated line.

11. The pre-cut fibrous insulation blanket according to claim 9, wherein:

the first sheet with the first separable connector is permeable to moisture.

12. The pre-cut fibrous insulation blanket according to claim 11, wherein:

the first sheet with the first separable connector is a light weight fibrous mat.

13. The pre-cut fibrous insulation blanket according to claim 11, wherein:

the first sheet with the first separable connector is a polymeric sheet.

14. The pre-cut fibrous insulation blanket according to claim 4, wherein:

the first separable connector is a strip, extending along the length of the first cut, which is bonded to the first major surface of the fibrous insulation blanket on each side of the first cut.

15. The pre-cut fibrous insulation blanket according to claim 4, wherein:

the first separable connector is a first strip, extending along the length of the first cut, which is bonded to the first major surface of the fibrous insulation blanket on each side of the first cut; and the second separable connector is a second strip, extending along the length of the first cut, which is bonded to the second major surface of the fibrous insulation blanket on each side of the first cut.

16. The pre-cut fibrous insulation blanket according to claim 4, wherein:

the fibrous insulation blanket is a resilient glass fiber insulation blanket having a density between about 0.4 pound/ft$^3$ and about 1.5 pounds/ft$^3$; the width of the fibrous insulation blanket is about fourteen and one half to about fifteen inches; the thickness of the fibrous insulation blanket is at least three inches; and the fibrous insulation blanket is at least forty six inches long.

17. The pre-cut fibrous insulation blanket according to claim 4, wherein:

the fibrous insulation blanket is a resilient glass fiber insulation blanket having a density between about 0.4 pound/ft$^3$ and about 1.5 pounds/ft$^3$; the width of the fibrous insulation blanket is about twenty two and one half to about twenty three inches; the thickness of the fibrous insulation blanket is at least three inches; and the fibrous insulation blanket is at least forty six inches long.

18. The pre-cut fibrous insulation blanket according to claim 4, wherein:

the fibrous insulation blanket is a resilient glass fiber insulation blanket having a density between about 0.4 pound/ft$^3$ and about 1.5 pounds/ft$^3$; the width of the fibrous insulation blanket is about thirteen to about thirteen and one half inches; the thickness of the fibrous insulation blanket is at least three inches; and the fibrous insulation blanket is at least forty six inches long.

19. The pre-cut fibrous insulation blanket according to claim 1, wherein:

a vapor barrier facing sheet overlays and is bonded to the second major surface of the fibrous insulation blanket; the facing sheet has a second separable connector holding the adjacent sections of the fibrous insulation blanket separated by the first cut together adjacent the second major surface of the fibrous insulation blanket for handling and being separable by hand along the length of the first cut whereby the fibrous insulation blanket can be handled as a unit for insulating a cavity having a width about equal to the width of the pre-cut fibrous insulation blanket or easily separated by hand into sections at the first cut for insulating a cavity having a width less than the width of the pre-cut fibrous insulation blanket.

20. The pre-cut fibrous insulation blanket according to claim 19, wherein:

the facing sheet is made of a material selected from the group consisting of kraft paper, polymeric film, and foil-scrim-kraft paper laminate.

21. The pre-cut fibrous insulation blanket according to claim 19, wherein:

the second separable connector is a perforated line in the facing sheet.

22. The pre-cut fibrous insulation blanket according to claim 21, wherein:

the perforations of the perforated line in the facing sheet are filled with a bonding agent that bonds the facing sheet to the second major surface of the fibrous insulation blanket to close the perforations so that the facing sheet functions as a vapor barrier.

23. The pre-cut fibrous insulation blanket according to claim 21, wherein:

the facing sheet has a first pair of tabs, adjacent lateral edges of the first major surface of the fibrous insulation blanket, which extend along the length of the insulation blanket, for securing the fibrous insulation blanket to framing members; and the facing sheet has a second pair of tabs, adjacent the first cut and extending along the length of the fibrous insulation blanket, for securing the sections of the fibrous insulation blanket adjacent the first cut to framing members; and each tab of the second pair of tabs is joined to the other of the second pair of tabs by the perforated line.

24. The pre-cut fibrous insulation blanket according to claim 23, wherein:

the second pair of tabs comprises a portion of the facing sheet double folded upon itself to form a Z-shaped pleat.

25. The pre-cut fibrous insulation blanket according to claim 23, wherein:

each of the second pair of tabs comprises a portion of the facing sheet double folded upon itself to form a Z-shaped pleat.

26. The pre-cut fibrous insulation blanket according to claim 23, wherein:

the second pair of tabs is formed by a second sheet bonded to the facing sheet along both sides of the first cut and each of the second pair of tabs comprises a portion of the second sheet double folded upon itself to form a Z-shaped pleat.

27. The pre-cut fibrous insulation blanket according to claim 19, wherein:

the facing sheet comprises a series of sheets with overlapping lateral edge portions that are separably bonded together; and the second separable connector of the facing sheet is formed by the overlapping, separably bonded, lateral edge portions of successive sheets of the series of sheets.

28. The pre-cut fibrous insulation blanket according to claim 19, wherein:

the first separable connector is a portion of a sheet, overlaying and bonded to the first major surface of the fibrous insulation blanket on each side of the first cut, which is separable by hand along the length of the first cut; and the sheet is permeable to water vapor.

29. The pre-cut fibrous insulation blanket according to claim 28, wherein:

the sheet is weakened along a line extending the length of the first cut to be separable by hand along the length of the first cut.

30. The pre-cut fibrous insulation blanket according to claim 19, wherein:

the first separable connector is a strip extending along the length of the first cut which is bonded to the first major surface of the fibrous insulation blanket on each side of the first cut.

31. The pre-cut fibrous insulation blanket according to claim 19, wherein:

the fibrous insulation blanket is a resilient glass fiber insulation blanket having a density between about 0.4 pound/ft$^3$ and about 1.5 pounds/ft$^3$; the width of the fibrous insulation blanket is about fourteen and one half to about fifteen inches; the thickness of the fibrous insulation blanket is at least three inches; and the fibrous insulation blanket is at least forty six inches long.

32. The pre-cut fibrous insulation blanket according to claim 19, wherein:

the fibrous insulation blanket is a resilient glass fiber insulation blanket having a density between about 0.4 pound/ft$^3$ and about 1.5 pounds/ft$^3$; the width of the fibrous insulation blanket is about twenty two and one half to about twenty three inches; the thickness of the fibrous insulation blanket is at least three inches; and the fibrous insulation blanket is at least forty six inches long.

33. The pre-cut fibrous insulation blanket according to claim 19, wherein:

the fibrous insulation blanket is a resilient glass fiber insulation blanket having a density between about 0.4 pound/ft$^3$ and about 1.5 pounds/ft$^3$; the width of the fibrous insulation blanket is about thirteen to about thirteen and one half inches; the thickness of the fibrous insulation blanket is at least three inches; and the fibrous insulation blanket is at least forty six inches long.

34. The pre-cut fibrous insulation blanket according to claim 1, wherein:

the fibrous insulation blanket has a second cut extending from the first major surface to the second major surface of the fibrous insulation blanket; the second cut extends for the length of the fibrous insulation blanket and is spaced laterally from the first cut and from both lateral edges of the fibrous insulation blanket; the fibrous insulation blanket has adjacent, longitudinally extending sections separated by the second cut; and a second separable connector holds the adjacent sections of the fibrous insulation blanket separated by the second cut together adjacent the first major surface of the fibrous insulation blanket for handling and is separable by hand along the length of the second cut whereby the fibrous insulation blanket can be handled as a unit for insulating a cavity having a width about equal to the width of the fibrous insulation blanket or easily separated by hand into sections at the first and second cuts and separable connectors for insulating a cavity having a lesser width.

35. The pre-cut fibrous insulation blanket according to claim 34, wherein:

a first sheet overlays and is bonded to the first major surface of the fibrous insulation blanket on each side of the first and second cuts; and the first separable connector is a portion of the first sheet which is separable by hand along the length of the first cut and the second separable connector is a portion of the first sheet which is separable by hand along the length of the second cut.

36. The pre-cut fibrous insulation blanket according to claim 34, wherein:

the first separable connector is a first strip, extending along the length of the first cut which is bonded to the first major surface of the fibrous insulation blanket on each side of the first cut; and the second separable connector is a second strip, extending along the length of the second cut, which is bonded to the first major surface of the fibrous insulation blanket on each side of the second cut.

37. The pre-cut fibrous insulation blanket according to claim 34, wherein:

a third separable connector holds the adjacent sections of the fibrous insulation blanket separated by the first cut together adjacent the second major surface of the fibrous insulation blanket for handling and is separable by hand along the length of the first cut and a fourth separable connector holds the adjacent sections of the fibrous insulation blanket separated by the second cut together adjacent the second major surface of the fibrous insulation blanket for handling and is separable by hand along the length of the second cut whereby the fibrous insulation blanket can be handled as a unit for insulating a cavity having a width about equal to the width of the pre-cut fibrous insulation blanket or easily separated by hand into sections at the first and second cuts for insulating a cavity having a width less than the width of the pre-cut fibrous insulation blanket.

38. The pre-cut fibrous insulation blanket according to claim 37, wherein:

the first and second separable connectors are portions of a first sheet, overlaying and bonded to the first major surface of the fibrous insulation blanket on each side of the first and second cuts, which are separable by hand along the lengths of the first and second cuts; and the third and fourth separable connectors are portions of a second sheet, overlaying and bonded to the second major surface of the fibrous insulation blanket on each side of the first and second cuts, which are separable by hand along the lengths of the first and second cuts.

39. The pre-cut fibrous insulation blanket according to claim 38, wherein:

the first sheet with the first and second separable connectors is permeable to water vapor.

40. The pre-cut fibrous insulation blanket according to claim 39, wherein:

the first sheet with the first and second separable connectors is a light weight fibrous mat.

41. The pre-cut fibrous insulation blanket according to claim 39, wherein:

the first sheet with the first and second separable connectors is a polymeric sheet.

42. The pre-cut fibrous insulation blanket according to claim 37, wherein:

the first and second separable connectors are portions of a first sheet, overlaying and bonded to the first major surface of the fibrous insulation blanket on each side of the first and second cuts, which are weakened along lines extending the lengths of the first and second cuts to be separable by hand along the lengths of the first and second cuts; and the third and fourth separable connectors are portions of a second sheet overlaying and bonded to the second major surface of the fibrous insulation blanket on each side of the first and second cuts.

43. The pre-cut fibrous insulation blanket according to claim 42, wherein:

the lines of weakness in the first sheet are perforated lines.

44. The pre-cut fibrous insulation blanket according to claim 43, wherein:

the first sheet with the first and second separable connectors is permeable to water vapor.

45. The pre-cut fibrous insulation blanket according to claim 44, wherein:

the first sheet with the first and second separable connectors is a light weight fibrous mat.

46. The pre-cut fibrous insulation blanket according to claim 44, wherein:

the first sheet with the first and second separable connectors is a polymeric sheet.

47. The pre-cut fibrous insulation blanket according to claim 37, wherein:

the first separable connector is a first strip, extending along the length of the first cut, which is bonded to the first major surface of the fibrous insulation blanket on each side of the first cut; and the second separable connector is a second strip, extending along the length of the second cut, which is bonded to the first major surface of the fibrous insulation blanket on each side of the second cut.

48. The pre-cut fibrous insulation blanket according to claim 37, wherein:

the first separable connector is a first strip, extending along the length of the first cut, which is bonded to the first major surface of the fibrous insulation blanket on each side of the first cut; the second separable connector is a second strip, extending along the length of the second cut, which is bonded to the first major surface of the fibrous insulation blanket on each side of the second cut; the third separable connector is a third strip, extending along the length of the first cut, which is bonded to the second major surface of the fibrous insulation blanket on each side of the first cut; and the fourth separable connector is a fourth strip, extending along the length of the second cut, which is bonded to the second major surface of the fibrous insulation blanket on each side of the second cut.

49. The pre-cut fibrous insulation blanket according to claim 37, wherein:

the fibrous insulation blanket is a resilient glass fiber insulation blanket having a density between about 0.4 pound/ft$^3$ and about 1.5 pounds/ft$^3$; the width of the fibrous insulation blanket is about fourteen and one half to about fifteen inches; the thickness of the fibrous insulation blanket is at least three inches; and the fibrous insulation blanket is at least forty six inches long.

50. The pre-cut fibrous insulation blanket according to claim 37, wherein:

the fibrous insulation blanket is a resilient glass fiber insulation blanket having a density between about 0.4 pound/ft$^3$ and about 1.5 pounds/ft$^3$; the width of the fibrous insulation blanket is about twenty two and one half to about twenty three inches; the thickness of the fibrous insulation blanket is at least three inches; and the fibrous insulation blanket is at least forty six inches long.

51. The pre-cut fibrous insulation blanket according to claim 37, wherein:

the fibrous insulation blanket is a resilient glass fiber insulation blanket having a density between about 0.4 pound/ft$^3$ and about 1.5 pounds/ft$^3$; the width of the fibrous insulation blanket is about thirteen to about thirteen and one half inches; the thickness of the fibrous insulation blanket is at least three inches; and the fibrous insulation blanket is at least forty six inches long.

52. The pre-cut fibrous insulation blanket according to claim 34, wherein:

a vapor barrier facing sheet overlays and is bonded to the second major surface of the fibrous insulation blanket; the facing sheet has a third separable connector holding the adjacent sections of the fibrous insulation blanket separated by the first cut together adjacent the second major surface of the fibrous insulation blanket for handling and being separable by hand along the length of the first cut and a fourth separable connector holding the adjacent sections of the fibrous insulation blanket separated by the second cut together adjacent the second major surface of the fibrous insulation blanket for handling and being separable by hand along the length of the second cut whereby the fibrous insulation blanket can be handled as a unit for insulating a cavity having a width about equal to the width of the pre-cut fibrous insulation blanket or easily separated by hand into sections at the first and second cuts for insulating a cavity having a width less than the width of the pre-cut fibrous insulation blanket.

53. The pre-cut fibrous insulation blanket according to claim 52, wherein:

the facing sheet is made of a material selected from the group consisting of kraft paper, polymeric film, and foil-scrim-kraft paper laminate.

54. The pre-cut fibrous insulation blanket according to claim 52, wherein:

the third and fourth separable connectors are perforated lines in the facing sheet.

55. The pre-cut fibrous insulation blanket according to claim 54, wherein:

the perforations of the perforated lines in the facing sheet are filled with a bonding agent that bonds the facing sheet to the second major surface of the fibrous insulation blanket to close the perforations so that the facing sheet functions as a vapor barrier.

56. The pre-cut fibrous insulation blanket according to claim 54, wherein:

the facing sheet has a first pair of tabs, adjacent lateral edges of the first major surface of the fibrous insulation blanket, which extend along the length of the insulation blanket, for securing the fibrous insulation blanket to framing members; and the facing sheet has a second and a third pair of tabs, adjacent the first and second cuts, respectively, and extending along the length of the fibrous insulation blanket, for securing the sections of the fibrous insulation blanket adjacent the first and second cuts to framing members; and each tab of the second and third pairs of tabs is joined to the other tab of the pair of tabs by one of the perforated lines.

57. The pre-cut fibrous insulation blanket according to claim 56, wherein:

the second and third pair of tabs each comprise a portion of the facing sheet double folded upon itself to form a Z-shaped pleat.

58. The pre-cut fibrous insulation blanket according to claim 56, wherein:

each of the tabs of the second and third pair of tabs comprises a portion of the facing sheet double folded upon itself to form a Z-shaped pleat.

59. The pre-cut fibrous insulation blanket according to claim 56, wherein:

the second pair of tabs is formed by a second sheet bonded to the facing sheet along both sides of the first cut and each of the second pair of tabs comprises a portion of the second sheet double folded upon itself to form a Z-shaped pleat; and the third pair of tabs is formed by a third sheet bonded to the facing sheet along both sides of the second cut and each of the third pair of tabs comprises a portion of the third sheet double folded upon itself to form a Z-shaped pleat.

60. The pre-cut fibrous insulation blanket according to claim 52, wherein:

the facing sheet comprises a series of sheets with overlapping lateral edge portions that are separably bonded together; and the third and fourth separable connectors of the facing sheet are formed by the overlapping, separably bonded, lateral edge portions of successive sheets of the series of sheets.

61. The pre-cut fibrous insulation blanket according to claim 52, wherein:

the first and second separable connectors are portions of a sheet, overlaying and bonded to the first major surface of the fibrous insulation blanket on each side of the first and second cuts, which are separable by hand along the lengths of the first and second cut; and the sheet is permeable to water vapor.

62. The pre-cut fibrous insulation blanket according to claim 61, wherein:

the sheet is weakened along lines extending the lengths of the first and second cuts to be separable by hand along the lengths of the first and second cuts.

63. The pre-cut fibrous insulation blanket according to claim 52, wherein:

the first separable connector is a first strip extending along the length of the first cut which is bonded to the first major surface of the fibrous insulation blanket on each side of the first cut; and the second separable connector is a second strip extending along the length of the second cut which is bonded to the first major surface of the fibrous insulation blanket on each side of the second cut.

64. The pre-cut fibrous insulation blanket according to claim 52, wherein:

the fibrous insulation blanket is a resilient glass fiber insulation blanket having a density between about 0.4 pound/ft$^3$ and about 1.5 pounds/ft$^3$; the width of the fibrous insulation blanket is about fourteen and one half to about fifteen inches; the thickness of the fibrous insulation blanket is at least three inches; and the fibrous insulation blanket is at least forty six inches long.

65. The pre-cut fibrous insulation blanket according to claim 52, wherein:

the fibrous insulation blanket is a resilient glass fiber insulation blanket having a density between about 0.4 pound/ft$^3$ and about 1.5 pounds/ft$^3$; the width of the fibrous insulation blanket is about twenty two and one half to about twenty three inches; the thickness of the fibrous insulation blanket is at least three inches; and the fibrous insulation blanket is at least forty six inches long.

66. The pre-cut fibrous insulation blanket according to claim 52, wherein:

the fibrous insulation blanket is a resilient glass fiber insulation blanket having a density between about 0.4 pound/ft$^3$ and about 1.5 pounds/ft$^3$; the width of the fibrous insulation blanket is about thirteen to about thirteen and one half inches; the thickness of the fibrous insulation blanket is at least three inches; and the fibrous insulation blanket is at least forty six inches long.

* * * * *